(12) United States Patent
Reshef et al.

(10) Patent No.: US 12,301,376 B2
(45) Date of Patent: May 13, 2025

(54) DYNAMIC ENERGY DETECTION THRESHOLD AND TRANSMISSION POWER ADJUSTMENT

(71) Applicant: Intel Corporation, Santa Clara, CA (US)

(72) Inventors: Ehud Reshef, Qiryat Tivon (IL); Ofer Hareuveni, Ha (IL); Leor Rom, Haifa (IL)

(73) Assignee: Intel Corporation, Santa Clara, CA (US)

( * ) Notice: Subject to any disclaimer, the term of this patent is extended or adjusted under 35 U.S.C. 154(b) by 773 days.

(21) Appl. No.: 17/110,539

(22) Filed: Dec. 3, 2020

(65) Prior Publication Data

US 2022/0182249 A1 Jun. 9, 2022

(51) Int. Cl.
*H04L 12/18* (2006.01)
*H04W 28/06* (2009.01)
*H04W 28/18* (2009.01)

(52) U.S. Cl.
CPC ........... *H04L 12/189* (2013.01); *H04W 28/06* (2013.01); *H04W 28/18* (2013.01)

(58) Field of Classification Search
CPC .... H04L 12/189; H04W 28/06; H04W 28/18; H04W 52/243; H04W 52/286; H04W 52/50; H04W 74/0808
See application file for complete search history.

(56) References Cited

U.S. PATENT DOCUMENTS

| | | | |
|---|---|---|---|
| 10,757,655 B1* | 8/2020 | Vivanco | H04W 52/08 |
| 2008/0279213 A1* | 11/2008 | Tong | H04L 12/413 |
| | | | 370/458 |
| 2018/0242222 A1* | 8/2018 | Shinohara | H04W 48/06 |
| 2018/0288803 A1* | 10/2018 | Shinohara | H04W 28/06 |
| 2019/0191385 A1* | 6/2019 | Shinohara | H04W 52/386 |
| 2019/0200385 A1* | 6/2019 | Xue | H04W 72/0473 |
| 2019/0239124 A1* | 8/2019 | Gacanin | H04W 28/18 |
| 2020/0280391 A1* | 9/2020 | Zhang | H04W 74/0808 |
| 2020/0336218 A1* | 10/2020 | Hassan | H04L 25/4917 |
| 2020/0344013 A1* | 10/2020 | Seely | H04W 28/04 |
| 2021/0360694 A1* | 11/2021 | Pandian | H04W 28/065 |
| 2022/0095135 A1* | 3/2022 | Kapala | H04W 24/08 |
| 2022/0232481 A1* | 7/2022 | Kusashima | H04W 52/10 |

* cited by examiner

*Primary Examiner* — Chirag G Shah
*Assistant Examiner* — Joshua Smith
(74) *Attorney, Agent, or Firm* — Banner & Witcoff Ltd.

(57) ABSTRACT

Techniques are disclosed for dynamically adjusting transmission parameters such as transmission output power and the energy detection (ED) threshold (TH) utilized by wireless devices to prevent collision and interference between different device transmissions. The techniques include dynamically adjusting the transmission parameters based upon various scenarios or conditions. The techniques include dynamically adjusting the transmission parameters on a per-packet basis, depending upon the particular type of packet, and/or considering other type of communication parameters.

21 Claims, 9 Drawing Sheets

DYNAMIC ENERGY DETECTION THRESHOLD AND TRANSMISSION POWER ADJUSTMENT

TECHNICAL FIELD

Aspects described herein generally relate to techniques for dynamically adjusting transmission parameters associated with data packet transmissions via a wireless channel, which include the energy detection threshold and transmission output power.

BACKGROUND

Wireless standards define a physical carrier sense mechanism to determine if a radio frequency (RF) medium is busy, thereby avoiding transmission collisions that would otherwise result in interference between different transmitting devise. The current implementation of these mechanisms includes setting a "busy medium" energy detection (ED) threshold (TL) to a predetermined value, which is configured according to the channel bandwidth. The use of such a static ED threshold, however, has various drawbacks.

BRIEF DESCRIPTION OF THE DRAWINGS/FIGURES

The accompanying drawings, which are incorporated herein and form a part of the specification, illustrate the aspects of the present disclosure and, together with the description, and further serve to explain the principles of the aspects and to enable a person skilled in the pertinent art to make and use the aspects.

The exemplary aspects of the present disclosure will be described with reference to the accompanying drawings. The drawing in which an element first appears is typically indicated by the leftmost digit(s) in the corresponding reference number.

DETAILED DESCRIPTION

Figure 1:
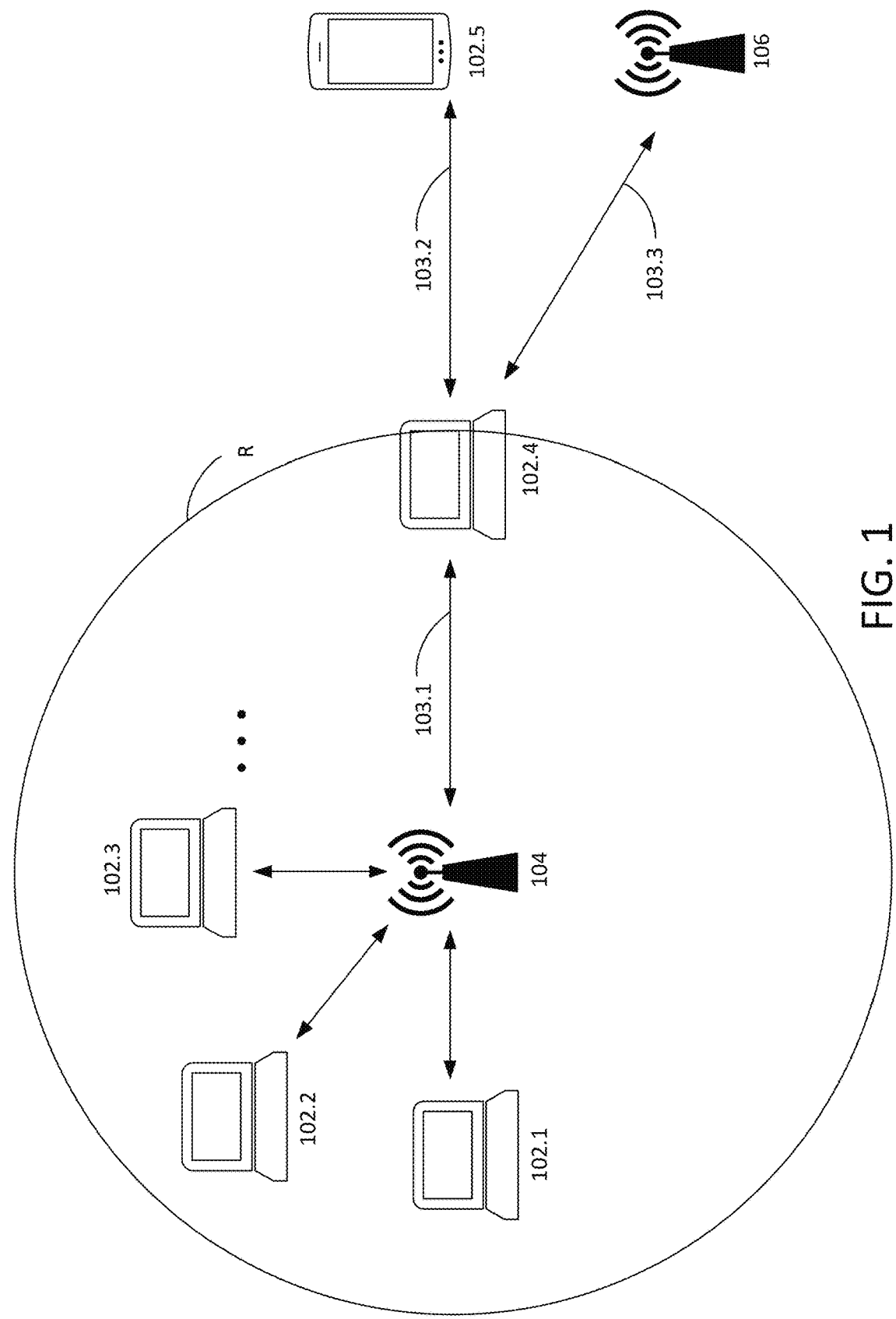
FIG. 1 illustrates an example wireless network, in accordance with one or more aspects of the present disclosure.

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

Again, previous solutions set the energy detection (ED) threshold TL to a static value, which is typically set in accordance with a particular channel bandwidth, frequency, and a maximum transmission output power that can be achieved via a particular wireless device such as a station (STA), for instance, operating in accordance with the IEEE 802.11 Working Group standards. But such solutions do not allow for any transmissions when interference is detected by the STA (e.g. a measured RF energy on the same wireless channel) that exceeds the ED TL. However, such an approach is overly conservative as the ED TL is based upon the maximum power that an STA could potentially transmit while not resulting in interfering collision with concurrent transmissions from other transmitters. Thus, although all transmissions are prevented under such circumstances, this does not necessarily mean that an STA transmission would not actually be successful and not interfere with other devices if the STA were able to adjust its transmit power accordingly (e.g. causing only a low interference level). Conventional solutions that use a static ED TL therefore do not utilize the full capacity of the spectrum, resulting in a low user experience such as high latency, high jitter, and low throughput.

Therefore, the aspects described herein address these issues by utilizing a variable or dynamic ED TL, in contrast to the conventional usage of a predetermined or static ED TL. To do so, and as further discussed in detail below, the aspects described herein may implement a dynamic adjustment of transmission output power and the accompanying ED TL that is based upon the transmission output power of the device, on a per data packet basis. In doing so, the aspects described herein may further consider the type of packet being transmitted as well as other factors.

By allowing dynamic adjustment of the transmission power and ED TL as discussed in further detail herein, the aspects facilitate concurrent operation of a device during the presence of interference that would otherwise exceed the static ED TL, thus improving spectral usage, reducing packet latency, allowing for higher throughput, reducing jitter, and improving power consumption. Moreover, the aspects described herein facilitate higher spectral reuse, as well as key opportunities for new usages, spatial reuse, and may achieve improved packet error rate (PER).

It is noted that the aspects herein may be described with reference to the IEEE 802.11 Working Group, which implement devices that are referred to as stations (STAs) within a wireless network according to such communication protocols that operate using the ED TL and transmission output power as discussed in further detail below. However, this is by way of example and not limitation, and the aspects described herein may be applicable to any suitable type of wireless communication system that uses an alternative or analogous busy channel detection system to arbitrate data communications. Moreover, the aspects described herein may be implemented in accordance with the 2.4 GHz band, and may be particularly useful towards achieving considerable channel re-use of the 6-7 GHz band, as well as enabling peer-to-peer short range usage within this spectrum while being fully complaint with worldwide regulatory rules.

FIG. 1 illustrates an example wireless network, in accordance with one or more aspects of the present disclosure. The wireless network 100 as shown in FIG. 1 may include any suitable number of user equipments (UEs) 102.1-102.N, with five being illustrated in FIG. 1 for purposes of brevity. The UEs 102 may be serviced by a base station (BS) 104 in accordance with any suitable number and/or type of communication protocols, in various aspects. The base station 104 may be implemented as any suitable type of device configured to service any suitable number and/or type of UEs 102 within a wireless range R of the base station 104. The UEs 102 may be implemented as any suitable type of device configured to communicate with the base station 104, other base stations (e.g. BS 106), other base stations not shown in FIG. 1, other UEs and/or wireless devices not shown in FIG. 1, etc. For example, the UEs 102 may be implemented as any suitable type of device configured to transmit and receive wireless communications in accordance with the aspects as described herein to facilitate data connectivity, such as laptops, personal computers, tablet computers, mobile phones, smart watches, fitness tracking devices, etc. As further discussed herein, the UEs 102, base stations 104, as well as other devices not shown in FIG. 1 but which may form a part of the wireless network 100, may communicate with one another via the transmission and reception of data packets via established wireless links, and may do so in accordance with any suitable type of communication protocols.

For example, the base station 104 may be implemented as an access point (AP) that is configured to communicate with each of the UEs 102 within the wireless range R and support data connectivity to the Internet or other networks, for example, in accordance with any suitable techniques to do so, including known techniques. The base station 104 and the UEs 102 may implement communication protocols such as Wi-Fi protocols associated with the 802.11 Working Group, although this is by way of example and not limitation. In accordance with aspects in which the base station 104 and the UEs 102 operate in accordance with Wi-Fi protocols, the UEs 102 may alternatively be referred to herein as stations (STAs), although again the aspects described herein are not limited to the use of Wi-Fi or other specific protocols.

With continued reference to FIG. 1, the base station 104 may communicate with the UEs 102.1, 102.2, 102.3 via various respective wireless links, which are represented by the arrows as shown in FIG. 1 as well as the other Figures as relevant. In the example shown in FIG. 1, the base station 104 is shown communicating with the UEs 102.1-102.3. Each of the UEs 102 may also be configured to communicate with one another, other base stations not shown in FIG. 1, and/or other UEs 102 using the same protocol as the base station 104 (e.g. Wi-Fi) or different communication protocols. For example, the UE 102.4 as shown in FIG. 1 may communicate with the base station 104 via a wireless link 103.1 as well as an additional UE 102.5 via a wireless link 103.2.

Again, the wireless network 100 may operate in accordance with any suitable type of wireless network communications and protocols, and are not limited to the examples discussed herein. However, the aspects described herein may implement protocols defined by the IEEE 802.11 Working Group to utilize protocols defined or otherwise implemented by such standards. For instance, certain protocols such as the IEEE 802.11 2016 Standard, published Dec. 14, 2016, for example, uses a CSMA/CA (Carrier Sense Multiple Access/Collision Avoidance) protocol that is defined for carrier transmission within 802.11 networks. Unlike CSMA/CD (Carrier Sense Multiple Access/Collision Detect), which deals with transmissions after a collision has occurred, the CSMA/CA protocol acts to prevent collisions before they occur. To do so, the CSMA/CA protocol defines a physical carrier sense mechanism to determine whether the radio frequency (RF) medium is busy.

In an aspect, the base station 104 and/or the UEs 102 may implement such CSMA/CA protocols, although any suitable standard or definition of determining whether an RF medium is busy may be implemented in accordance with the aspects as described herein. In an aspect, the base station 104 and/or the UEs 102 may implement the physical carrier sense in accordance with the CSMA/CA protocol by performing a listening operation during time periods in which the device is not currently transmitting or receiving. This listening operation may include a UE 102 performing a physical carrier sense operation, during which time the RF energy on one or more channels is measured to determine whether other RF transmissions are occupying the channel and, if so, whether these exceed a current ED TL level that indicates interference in the wireless channel. This physical carrier sense operation thus functions to determine whether a frame (e.g. data packet) transmission is inbound for a UE 102 to receive and, if the medium is busy, the device radio will attempt to synchronize with the transmission. In this way, the physical carrier sense operation allows a UE 102 to determine whether the medium is busy before transmitting.

In other words, the transmission medium associated with the wireless links support communications between the devices in the network 100, and may be comprised of a specific channel frequency, carrier frequency, frequency band, etc., should be "clear" before a UE 102 is able to transmit. Otherwise, if RF signal measurements are detected on a particular transmission channel in excess of a defined threshold (e.g. the ED TL), then the transmission medium is considered to have excessive interference and thus the channel is not considered clear for transmission. It is recognized that transmitting during the presence of such interference risks transmissions not being received by other devices. In other words, it is expected that a device transmitting at its maximum transmission output power (e.g. EIRP) will introduce interference into the wireless channel that results in collision and interference to neighboring receivers, as well as violating the relevant regulations identified with the transmitting device's current geographic location if the transmission output power is set to the maximum permissible EIRP. The process of listening and measuring RF signal measurements to determine whether a transmission medium is busy or not may be referred to as clear channel assessment (CCA), which is defined in accordance with the Wi-Fi 802.11 Working Group protocols as discussed herein to facilitate an appraisal of the RF transmission medium prior to data transmissions over that medium.

Again, some wireless standards such as those associated with the IEEE 802.11 Working Group, for instance, define the ED TL for compliant products, which is set to a static, predetermined value to prevent concurrent transmissions when a medium is busy, thereby mitigating interference among devices operating within the same environment. However, some regulatory bodies such as the European Telecommunications Standards Institute (ETSI), for example, provide additional adaptivity rules that devices may implement in regions using ETSI compliance. These ETSI adaptivity rules allow a change of the ED TL according to the setting of the transmission output power within a certain range of effective isotropic radiated power (EIRP) levels. In addition, Federal Communication Commission (FCC) and ETSI rules for the 6-7 GHz band allow multiple new usages for Very Low Power operation, e.g. for power levels that are suitable for multiple peer-to-peer and ad-hoc usages. To do so, the CCA process implements the ED TL as the defined threshold noted above, which indicates the presence of excessive interference on a particular channel when measured RF signal energy levels on a channel meet or exceed the ED TL. The ED TL value is based upon the transmission output power of a particular device measured in terms of that device's EIRP and thus is considered a per-device threshold depending upon that particular device's transmission output power capabilities.

Thus, some current regulatory authorities authorize the adjustment of the ED TL for certain circumstances, such as ETSI regulations, which are described in the examples below. However, this is by way of example and not limitation, and the aspects described herein may be applicable for any regulatory body and/or region that allows for dynamic ED TL adjustment based on the transmission output power, and are not limited to only the ETSI. It is also noted that although some regulator bodies may allow for the adjustment of the ED TL, the current implementations of such ED TL adjustments fail to do so on a per-packet basis, and also fail to consider other factors when adjusting the transmission output power and ED TL, such as packet type, packet destination, various communication parameters such as data rate, proximity to other devices, etc., as further discussed herein.

The examples discussed herein are provided with respect to the use of an ED TL as defined in accordance with existing standards, but this is by way of example and not limitation. The aspects described herein may be defined in accordance with any suitable reference value, calibration, measurement, etc., which may be used to ascertain whether an excessive amount of interference is present on a particular transmission medium to arbitrate transmissions on that medium. As an example, ETSI regulations define the ED TL over the total nominal channel bandwidth of all operating channels used by a device. A device shall thus consider a channel as occupied when excessive interference is present, which is indicated when other transmissions are detected (e.g. via RF signal measurements) at a level greater than the ED TL. Moreover, ETSI regulations indicate that when a channel is occupied, a device (e.g. UE 102) is not allowed to transmit and shall continue to follow the rules defined by the CSMA/CA protocol.

The current ETSI rules, which are used in the following examples further discussed herein, define the ED TL for different scenarios as follows, with Pout representing the transmission output power associated with a relevant device in terms of the EIRP:

The 2.4 GHz ETSI ED TL
 Pout<10 dBm EIRP; no CCA needed
 Pout>=10 dBm EIRP; ED TL=−70 dBm/MHz+10×log 10 (100 mW/Pout) (Pout in mW EIRP)
The 5 GHz ETSI ED TL
 5 GHz ETSI ED TL=static at −75 dBm/MHz
The 6 GHz ETSI ED TL
 Pout<=14 dBm EIRP; ED TL=−75 dBm/MHz
 14 dBm<Pout<=23 dBm; ED TL=−85 dBm/MHz+23 dBm−Pout
 Pout>14 dBm; ED TL=−85 dBm/MHz In other words, ETSI regulations define ED TL values for different frequency bands, as well as the transmission output power of a device transmitting within those frequency bands. It is noted that a device thus has an ED TL that is inversely proportional to the transmission output power used for a data transmission on a particular channel. For instance, from the ETSI regulation definitions provided above, devices operating within the 6 GHz frequency having a transmission output power (e.g. EIRP) of 14 dBm are associated with a higher ED TL (−75 dBm/MHz) compared to a device having a transmission output power greater than 14 dBm EIRP (−85 dBm/MHz). Regardless of the particular value of the ED TL at any time, the ED TL still functions to arbitrate data transmissions by a device. That is, the ED TL represents a threshold RF energy level that indicates interference in a wireless channel that, when detected, prevents a device from transmitting data packets via that wireless channel using CCA for example, i.e. when the device measures RF energy in the wireless channel exceeding a (current) ED TH.

Thus, the aspects described herein may be implemented as part of the functioning components of one of the UEs 102 as shown in FIG. 1, for example, to enable a UE 102 to selectively adjust its transmission output power and ED TL, as well as other communication parameters associated with a data transmission on a per data packet basis, as further discussed below. The determination of the transmission output power and ED TL may be made by a UE 102 or the base station 104, for example, based upon the various conditions and scenarios as discussed herein. For example, the base station 104 and the UEs 102 may include various components to facilitate the transmission and reception of data packets in accordance with a communication protocol, as discussed herein with respect to FIG. 9. Additional details of the components included as part of the UEs 102 are further discussed herein, but may include, for instance, transmitters, receivers, transceivers, processors and/or processing circuitry, memory, antennas, ports, communication interfaces, etc. Thus, the functionality of the aspects as discussed herein with respect to the UEs 102 and the base station 104 may be performed in accordance with these components, additional or alternative hardware components, software components, or combinations of these, as further discussed herein.

Figure 2:
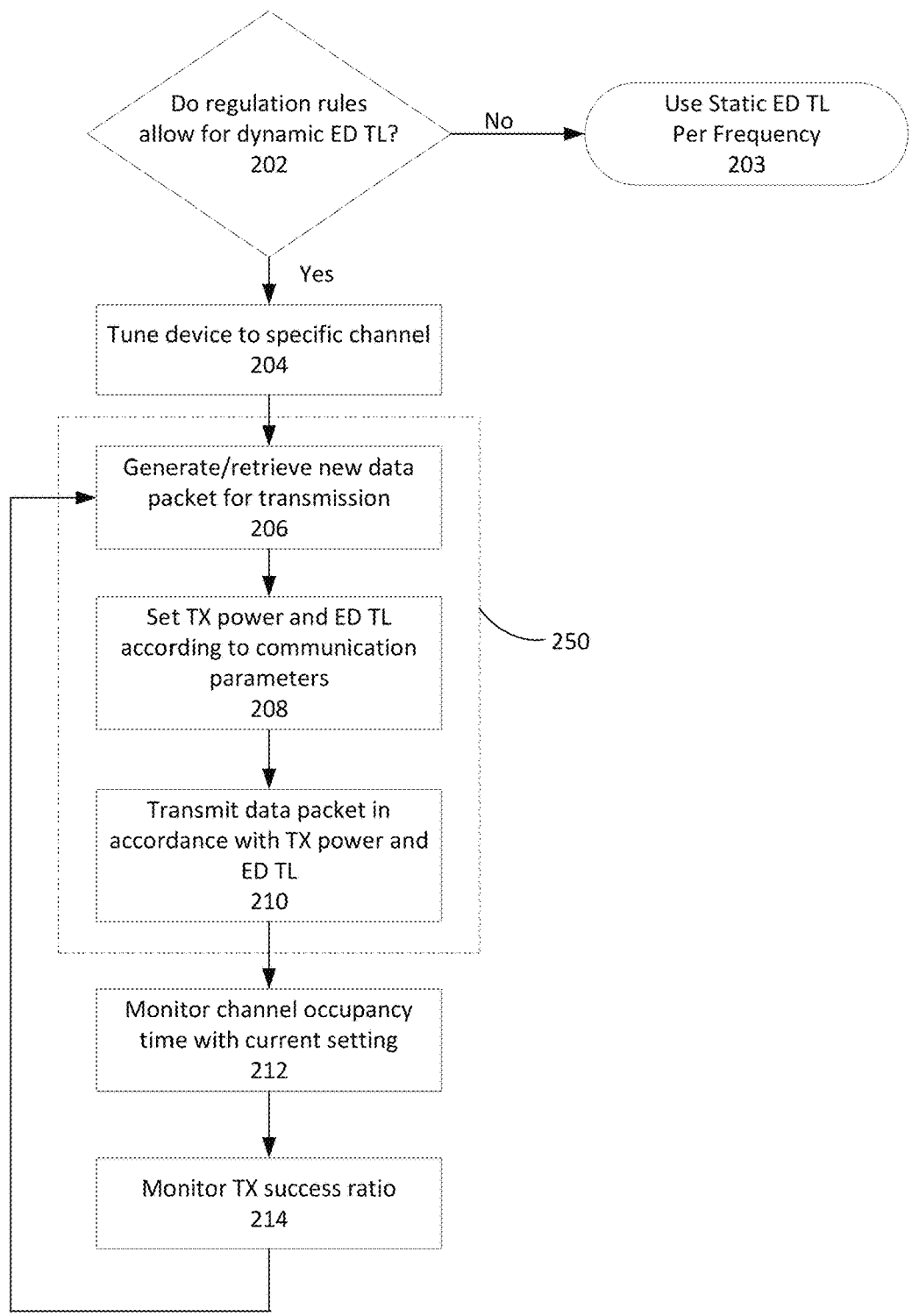
FIG. 2 illustrates an example process flow, in accordance with one or more aspects of the present disclosure.

FIG. 2 illustrates an example of a process flow, in accordance with one or more aspects of the present disclosure. The process flow 200 is an example of overall flow that may be implemented by the base station 104 and/or one or more of the UEs 102, for instance, to facilitate the per data packet ED TL and transmission output power adjustment in accordance with the aspects described herein. Again, the use of an adjustable or dynamic ED TL is only possible in certain geographic locations, specifically where a governing regulatory body allows for such functionality (e.g. the ETSI). Therefore, the process flow 200 begins with a determination (block 202) of whether the regulatory rules associated with a device (e.g. a UE 102) allow for dynamic ED TL adjustment. This may be determined, for instance, by the device ascertaining its geographic location using any suitable known techniques, and then determining whether a geographic location of the device matches one or more predetermined geographical locations or regions associated with a governing regulatory body that allows dynamic ED TL adjustment (e.g. Europe). If so, then the process flow 200 continues such that the device may selectively (i.e. the device may, but need not) adjust the output power of the transmitter and the ED TH, as further discussed below based upon various conditions or scenarios. Otherwise, the process flow 200 proceeds to use (block 203) a static ED TL per frequency or frequency band, as noted herein for regions in which the governing regulatory body does not allow for dynamic ED TL adjustment (e.g. currently the U.S. as of this writing).

Assuming that the dynamic ED TL adjustment is allowed, then the process flow 200 continues by the device tuning (block 204) to a particular channel in preparation of data packet transmission. This may include, for instance, a UE 102 electronically tuning (e.g. digitally tuning) a transmitter or transceiver component in preparation to transmit data packets over a specific wireless channel, which may be associated with a specific carrier frequency for instance, or a band or frequencies associated with a desired wireless channel.

Once the device is tuned to the desired wireless channel, the process flow 200 may include the generation or retrieval (block 206) of a new data packet for transmission via that wireless channel. This may include, for instance, the device generating a data packet in accordance with the particular communication protocol that is used or standard that is implemented. For example, if operating in accordance with the 802.11 Working Group of Wi-Fi protocols, the data packet may be identified with a data frame such as a Physical Layer Convergence Procedure (PLCP) service data unit (PSDU), a physical layer protocol data unit (PPDU) generated in accordance with such a data frame, etc. As the aspects described herein are not limited to Wi-Fi protocols, the term "data packet," as used herein should not be interpreted as only packets that contain data, packets of a specific type, and/or packets carrying a specific type of content. Instead, the term data packets as used herein may include any suitable set of data that has been formatted for transmission in accordance with any suitable type of communication protocol or standard For example, a data packet may include a set of data bits of any suitable format, number, and may include one or more types of assigned fields such as a preamble, a MAC layer or transport layer control, an application data payload, any other suitable types of payloads, error correction, Message Integrity Code(s) (MIC), etc. Thus, a data packet that is generated in block 206 may be in accordance with a Wi-Fi protocol (e.g. a PPDU), for example, but may be generated or retrieved using alternative or additional protocols that implement any suitable type of data structure, which may be sequentially transmitted to one or more other devices, as discussed herein. As an additional example, the term "data packet" may encompass Ethernet packets or any other suitable type of packet structure that are targeted to a single recipient or group of recipients, including management packets for instance.

Moreover, the data packet may be generated and/or retrieved based upon the particular communication parameters associated with a data transmission, as further discussed below. Thus, once the data packet is ready for transmission via the tuned wireless channel, the process flow 200 includes the device setting (block 208) the transmission output power and ED TL accordingly, which may be performed based upon one or more communication parameters associated with the data transmission. Additionally or alternatively, the process flow 200 may include setting (block 208) or adjusting the communication parameters, which may in turn result in an adjustment to the transmission output power and ED TL, as further discussed below. In any event, aspects include the device selectively adjusting the transmission output power and ED TL from an initial or previous (e.g. maximum) transmission output power to an adjusted transmission output power and ED TL, as well as selectively adjusting the ED TH from an initial or previous ED TH to an adjusted ED TH that reflects the changes in the transmission output power, as the ED TH value is calculated based upon the current transmission output power level, as noted above.

In other words, although the process flow 200 may include establishing (block 208) a new or adjusted transmission output power and accompanying ED TH, this need not be the case when it is not warranted to do so based upon RF signal energy measurements in the wireless channel not exceeding the current ED TH, or other wireless channel conditions or communication parameters, for instance. Thus, aspects include the device transmitting (block 210) the current data packet via the tuned wireless channel in accordance with either the current or initial (e.g. from the previous data packet transmission or a maximum) transmission output power and accompanying ED TH that was set (block 208) and/or transmitting (block 210) the current data packet via the tuned wireless channel in accordance with an adjusted transmission output power and accompanying ED TH that was set (block 208). Moreover, it is noted that the aspects described herein may set (block 208) the transmission output power and ED TH by removing the ED TH altogether, which may be allowed for transmissions under a threshold transmission output power level, as noted above and further discussed in detail below with reference to specific examples.

In any event, the aspects include the device selectively adjusting the ED TH and transmission output power for each data packet that is transmitted via the wireless channel based upon any suitable type of communication parameters or combinations of communication parameters, which may also be adjusted on a per data packet basis. These communication parameters may describe any suitable number of or type of metrics, conditions, and/or type of data communications or combination of which may be used to determine the appropriate transmission output power and resulting ED TH for each new data packet that is to be transmitted. Several examples of such communication parameters are provided below by way of example and not limitation. It is noted that the aspects described herein may utilize additional or alternate communication parameters to determine whether to adjust the transmission output power for a particular data packet and, if so, the amount by which the transmission output power should be adjusted to achieve the adjusted ED TH. The transmitting device noted in the following examples of communication parameters may refer to one of the devices in FIG. 1 (e.g. the base station 104 or one of the UEs 102), which may perform the process flow 200.

Furthermore, the various illustrative examples provided herein may calculate and adjust the transmission output power, ED TL, and/or communication parameters in accordance with any suitable techniques, including known techniques to do so. The adjustment of the transmission output power, ED TL values, and/or communication parameters as discussed herein, which may be performed on a per data packet basis, may collectively be referred to as transmission parameters. It is understood that the communication parameters described herein may include any suitable metric that influence the transmission of data within a wireless channel, and may include some parameters that are adjustable (e.g. MCS and data rate) as well as other parameters that function as feedback or may otherwise not be adjusted by a transmitting device (e.g. packet error rate (PER)). Some examples provided below include the use of thresholds or threshold ranges that may correlate to specific aspects of the communication parameters or other metrics used to determine the transmission parameters by way of example and not limitation. For instance, the aspects described herein may additionally or alternatively include, as an example, using a statistical analysis to determine, based upon a set of reference data or acquired data regarding previous wireless performance, the preferred transmission parameters for a particular data packet to be transmitted at a particular time via a wireless channel. As another example, a device (e.g. UE 102) may implement any suitable type of machine learning, for instance, to facilitate such functionality.

The Connection Between the Transmitting Device and the Receiving Device

In an aspect, when a transmitting device (e.g. UE 102.4) establishes a connection with a receiving device (e.g. a target STA for device transmissions), a maximum transmission output power may also be reduced for that particular wireless link. In some cases, the transmission output power can be limited as instructed by an AP or another transmitting device (e.g. base station 104 or a UE 102), regulatory rules, in accordance with SRD (Short Range Device) requirements, based upon a SAR (Specific Absorption Rate), based upon the usage of the link, etc.

For example, the communication parameters may include a type of connection to the receiving device, the type of receiving device, and/or a path loss between the transmitting device and the receiving device. In an aspect, a transmitting device may monitor and estimate path loss to a receiving device, which is subject to a range between the transmitting and the receiving device, as well as other metrics such as tunable beam forming, antenna radiation patterns, cable loss, etc. In an aspect, the transmitting device may monitor the path loss to a receiving device and/or any of the other metrics described herein related to this determination (e.g. range) using any suitable techniques, including known techniques to do so, and any one or more of the path loss and/or various metrics used to calculate the path loss may constitute communication parameters. With reference to FIG. 1, this may be the case, for instance, when the UE 102.4 forms an initial connection with the UE 102.5 via the wireless link 103.2. During the establishment of this connection, the UE 102.4 may determine, based upon the type of connection and/or the path loss (e.g. range) between the UE 102.4 and the UE 102.5, that the UE 102.4 may reduce its transmission output power from the maximum transmission output power and thus increase or eliminate the ED TL. Aspects include the transmitting device doing so, for example, based upon the range between the transmitting device and the receiving device being less than one or more threshold ranges, and the transmitting device using for example a predetermined transmission output power adjustment corresponding to each of these threshold ranges.

Path Loss to the Receiving STA

In an aspect, a transmitting device may monitor and estimate path loss to a receiving device and/or any of the other metrics described herein related to this determination (e.g. range) using any suitable techniques, including known techniques to do so. This may include the same technique as noted above with respect to the initial connection between the transmitting device and the receiving device, but may include the transmitting device monitoring the path loss between the transmitting device and the receiving device in a dynamic, periodic, or continuous manner after the connection is initially established. For example, based upon changes in the distance between the UE 102.4 and the UE 102.5, the transmitting device UE 102.4 may determine whether it can reduce its transmission output power while still maintaining a desired PHY data rate. This may include, for example, the UE 102.4 identifying when the UE 102.5 has moved within a threshold range from the UE 102.4, thus triggering the UE 102.4 to reduce the transmission output power and increase or eliminate the ED TH.

Interference Level

In an aspect, the transmitting device may monitor the interference level and channel conditions of the tuned wireless channel over time, which may include performing RF signal measurements during certain periods in which the device is not transmitting or receiving, for instance. From these RF signal measurements, the transmitting device may calculate communication parameters such as an average channel occupancy and corresponding PHY-layer characteristics. For example, the transmitting device may determine when the RF signal measurements and/or the average channel occupancy is/are in excess of relevant threshold value(s) (e.g. the current ED TH), and then reduce the transmission output power, increasing the ED TH. The transmitting device may optionally adjust other communication parameters such as the data rate, for example. The transmission output power and data rate may be adjusted, for instance, in accordance with a set of correlated values matching the RF signal measurements and/or the average channel occupancy, in various aspects. In this way, although the transmission output power and data rate are reduced in this scenario, the interference would otherwise completely prevent such transmissions from occurring.

The Packet Error Rate (PER)

The PER is an example of another communication parameter and is a measurement of how may data frames (e.g. data packets) were transmitted by the transmitting device and not received by the receiving device. In an aspect, the transmitting device may monitor the PER over time in accordance with specific transmission output power levels and ED TH values, and may optionally monitor other communication parameters (e.g. MCS). Using the PER as feedback, the transmitting device may determine whether a previous reduction in transmission output power was successful, and thus determine whether to further adjust the transmission output power based upon the monitored PER feedback. This may include, for example, using a predetermined set of PER threshold ranges, and adjusting the transmission output power and accompanying ED TH based upon a correlation of predetermined transmission output power adjustment setting for each of these corresponding PER threshold ranges. For example, a high PER may result in the transmitting device increasing the transmission output power, and vice-versa.

QoS Requirements

Additional communication parameters include Quality of Service (QoS) requirements, which describe an indication of the importance or priority of data packets and their sensitivity to withstand latency. Each data packet has its own QoS requirements. For instance, some data packets (e.g. voice or video data) are more sensitive to latency, while other data packets (e.g. background (BK) and best efforts (BE) data packets) may be buffered for a longer time. Thus, the data packet type, priority, or any other consideration in accordance with a data packet QoS requirement may be considered a communication parameter. Thus, aspects include the transmitting device determining, for each data packet to be transmitted, which packet should be prioritized using the QoS requirements and adjust the transmission output power and ED TL accordingly. This may include, for example, prioritizing a data packet based upon an identification of a specific packet type (e.g. BK, BE, EE, CL, VI, VO, NC, etc.), and a predetermined priority associated with that data packet type. To ensure less latency for higher priority data packets, the transmitting device may reference this predetermined priority for each data packet to adjust the transmission output power in accordance with a correlation to of priority to a predetermined set of adjusted transmitter output values, for instance. As an example, the transmitting device may reduce the transmission output power less for higher prioritized data packets, and vice-versa.

Payload Size

Another example of a communication parameter includes the payload size, which may impact the overall size of the data packet that is to be transmitted, as a larger payload increases data packet size. Data packets with a smaller payload may be transmitted at lower data rate, but still not consume a lot of airtime, while data packets with a larger payload, if transmitted at a lower data rate, will consume a significant amount of airtime. Thus, the aspects described herein include the transmitting device determining, for small payload packets, to reduce the PHY data rate, thereby allowing for the further adjustment of a lower transmission output power with a matching ED TL accordingly. However, for larger payload, the transmitting device may transmit at a higher or maximum PHY data rate and a higher or maximum transmission output power. Aspects include the transmitting device doing so, for example, based upon the size of a particular data packet to be transmitted being correlated to one or more threshold data packet sizes, and the transmitting device using a predetermined data rate adjustment and/or a predetermined transmission output power adjustment based upon the size of the data packet compared to one or more of these threshold data packet sizes. Moreover, it is noted that the PER (Packet Error Rate) for a given BER (Bit Error Rate) is determined by the signal-to-interference-plus-noise ratio (SINR) of the receiver, and is inversely proportional to the size of payload. Thus, the payload size may be used as one of the communication parameters to determine whether the transmission output power and ED TL should be changed for a particular data packet transmission, or may influence other communication parameters that are used to do so (e.g. the PER).

Modulation Coding Scheme (MCS) and Bandwidth (BW)

Still additional example of communication parameters include the MCS and BW, both of which impact the data rate (also a communication parameter) of data packet transmissions.

Data packets to be transmitted in accordance with a higher data rate should preferably be transmitted in accordance with a higher transmission output power. Thus, aspects include the transmitting device adjusting the MCS and/or BW to support a lower or higher PHY data rate as needed. Thus, the transmitting device may adjust the transmission output power to a lower setting (for a lower data rate) and to a higher transmission output power for higher data rates, with a matching ED TL accordingly in each case. Aspects include the transmitting device doing so, for example, based upon the MCS, BW, and/or data rate to be used for transmission of a particular data packet to be transmitted, which may be correlated to one or more types of MCS, BW, and/or threshold ranges of data rates. The transmitting device may then use a predetermined transmission output power adjustment based upon the MCS, BW, and/or data rate compared to a specific MCS, BW, and/or one or more of these threshold ranges of data rates.

Referring back to FIG. 2, the process flow 200 thus includes setting (block 208) the transmission output power and accompanying ED TL based upon the various communication parameters as noted above, for example, which again may also be adjusted on a per data packet basis (when possible). Once the transmission output power and the ED TL are set (block 208), the process flow 200 includes the transmitting device transmitting (block 210) the data packet in accordance with the current transmission parameters, which again encompass the transmission output power, ED TL, and communication parameter settings. In an aspect, the process flow 200 further includes the transmitting device monitoring (block 212) the current channel after transmission of the data packet in accordance with the specific transmission parameters that were used (e.g., MCS/BW) to transmit the data packet. This may include, for instance, the transmitting device listening or otherwise measuring the signal strength of RF signals within the current wireless channel to calculate an interference level, for example, or to otherwise monitor any of the communication parameters discussed above (e.g. PER) as a feedback mechanism. The transmitting device thus functions to monitor the wireless channel conditions such that the decision for setting (block 208) the transmission parameters for the next data packet to be transmitted may be made using the data ascertained via the channel monitoring (blocks 212 and/or 214), as discussed above.

In an aspect, the transmitting device may further determine (block 214) a success ratio for the transmitted data packet. This may include, for instance, determining whether the transmitted data packet was successfully received by the receiving device. This determination of the success ratio may include, for instance, determining a success ratio for one data packet transmission (e.g. one of previously-transmitted data packets) or more than one data packet transmission (e.g. a number of previous data packet transmissions), with the latter being defined as the PER (Packet Error Rate). However, for some protocols such as the 802.11 Working group protocols, for example, the success ratio may also be defined for each data packet (e.g. each unicast packet) that was transmitted and successfully received, which is acknowledged by the receiving device and otherwise assumed as packet error. Therefore, aspects include the transmitting device using any suitable means by which to ascertain the success ratio, such as the use of PER, the use of an individual packet error indication, etc. This may be performed, for instance, by determining whether an ACK was reported by the receiving device. The success of each transmitted data packet may be monitored in this manner for each data packet that is transmitted, and process flow 200 may then repeat this process for the next packet in the queue or transmission sequence (block 206). Thus, the transmitting device may adjust the transmission output power and ED TL (and optionally other communication parameters) on a per data packet basis, determine whether the adjustment is needed and, if so, update the transmitter output value and ED TL based upon the channel monitoring and success of prior transmissions as noted above for any suitable number of previous data packet transmissions. In this way, the transmitting device may monitor the channel conditions, previously-used transmission parameters, changes in transmission parameters, the success of previous transmissions, etc. over time and dynamically change the decision to adjust the transmission output power and ED TL on a per packet basis. As an illustrative example, the transmitter device may transmit a first data packet transmitted via a wireless channel, and adjust the transmitter output value and ED TL based upon one or more of the communication parameters as noted above. The transmitting device may then, for a second data packet transmitted via the wireless channel subsequent to the first data packet, further adjust the transmitter output value and ED TL based upon changes in the communication parameters with respect to when the first data packet was transmitted (e.g. if the data rate changes, if the PER has increased, if the receiving device has since moved further away, etc.).

ILLUSTRATIVE EXAMPLES

Figure 5:
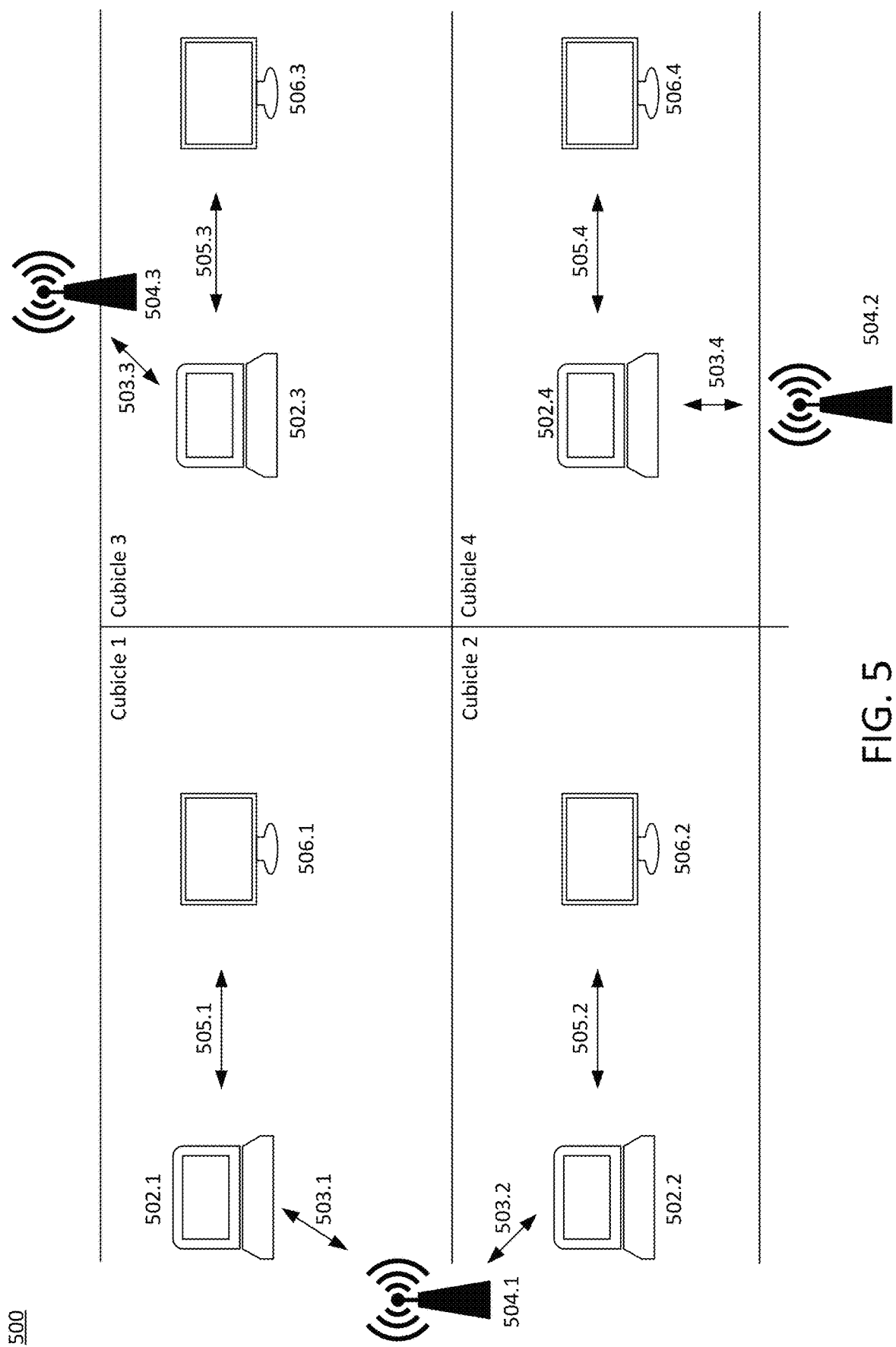
FIG. 5 illustrates an example wireless network, in accordance with one or more aspects of the present disclosure.

The following illustrative examples are provided with respect to the devices as shown in the wireless network 100 as shown in FIG. 1 and the wireless devices as shown in FIG. 5, with respect to the aspects implementing the process flow 200 as shown and described with reference to FIG. 2. These are provided for ease of explanation of the aspects described herein, and are by way of example and not limitation.

Example 1: Latency

As a first illustrative example, the base station 104 may be implemented as a basic service set (BSS) that services each of the UEs 102.1-102.4 in accordance with one or more Wi-Fi 802.11 Working Group protocols. The UE 102.4 is implemented as a BSS client and communicates with the BSS 104 via the wireless link 103.1. The UE 102.4 also communicates with another UE 102.5 via the wireless link 103.2 to support P2P Group Owner (GO) communications. In this example, the wireless link 103.1 represents a BSS 6 GHz low power indoor (LPI) connection, whereas the wireless link 103.2 represents a 6 GHz peer-to-peer voice over IP (VOIP), very low power (VLP) connection. The UE 102.4 is thus a BSS client that communicates with the BSS 104, as well as a P2P GO device that communicates with the UE 102.5 using the same channel. That is, the BSS 104 and the UE 102.4 share the same frequencies.

The BSS 104 may also service the UEs 102.1-102.3 creating a high traffic load in each case, which results in the BSS causing interference on the wireless channel used by the UE 102.4, which is the middle of a VOIP call with its P2P client, the UE 102.5. Therefore, in this scenario the UE 102.4 will not be able to transmit its latency-sensitive data packets in time due to BSS traffic, which results in an interference level in the wireless channel at an RF energy level that is higher than the ED TL used by the UE 102.4. As a result, the user VOIP call will be low quality due to the added latency over the air.

However, using the same scenario described above but applying the aspects described herein with reference to the process flow 200 as shown in FIG. 2, for example, the UE 102.4 may set a different ED TL for different receiving devices, i.e. for the transmission of data packets using the wireless links 103.1, 103.2. For example, assume that the UE 102.4 may transmit to the BSS 104 using the wireless link 103.1 having a transmission output power having a maximum EIRP of 24 dBm, which results in an ED TH of −85 dBm\MHz for any transmission from the UE 102.4 to the BSS 104. However, applying the process flow 200 as discussed herein, the UE 102.4 may set a different, more relaxed ED TH of −75 dBm\MHz when transmitting to the UE 102.5 via the wireless link 103.2, because this connection has a smaller transmission output power maximum EIRP limit of 14 dBm. In doing so, the UE 102.4 may transmit packets at a lower transmission output power, which will not cause interference to other nearby UEs 102, while the measured RF signal energy in the wireless channel is associated with a level of interference higher than −85 dBm/MHz, thereby improving latency and the user experience.

Figure 3:
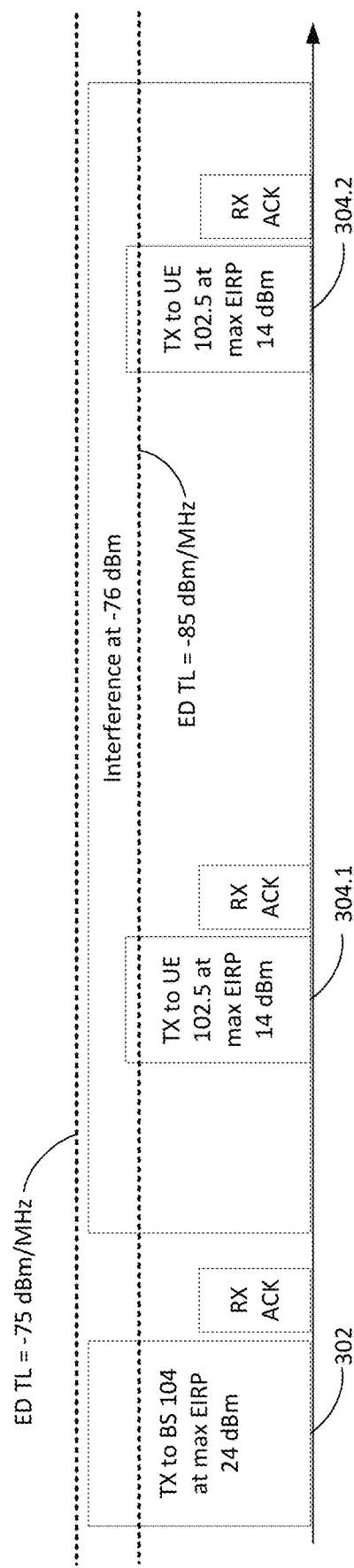
FIG. 3 illustrates an example timing diagram of device communications operating within a wireless network within a defined energy detection (ED) threshold (TL), in accordance with one or more aspects of the present disclosure.

An example of this is shown in further detail with respect to FIG. 3, which illustrates an example timing diagram of device communications operating within a wireless network within a defined ED TL. As shown in FIG. 3, transmission 302 corresponds to the transmissions by the UE 102.4 to the BSS 104, whereas the transmissions 304.1, 304.2 correspond to the transmissions by the UE 102.4 to the UE 102.5. The RX ACK transmissions are also shown, indicating ACK reports from the UE 102.5. The wireless channel interference level (e.g. measured RF signal energy levels) are assumed to be −76 dBm. FIG. 3 illustrates that the initial ED TL of −85 dBm/MHz is based upon the transmission output power maximum EIRP to the BSS 104 of 24 dBm, which would force the UE 102.4 to defer such transmissions via the wireless link 103.2 until the measured interference of −76 dBm decreases below the ED TL of −85 dBm/MHz. However, because the aspects described herein enable the UE 102.4 to adjust the ED TL based upon the lower transmission output power EIRP of 14 dBm for data packet transmissions to the UE 102.5, the ED TL is increased to −75 dBm/MHz. This ED TL is greater than the current interference level of −76 dBm, allowing the UE 102.4 to transmit data packets to the UE 102.5.

Example 2: Spectral Utilization

As a second illustrative example, the same configuration is used from Example 1 above with a few differences. In this example, the BSS 104 and the UEs 102.4, 102.5 still operate as discussed in Example 1, with the UE 102.4 transmitting to the BSS via the wireless link 103.1 and transmitting to the UE 102.5 via the wireless link 103.2. In this example, the UE 102.4 communicates with the UE 102.5 via a P2P connection within close range. The UE 102.4 may upload BE data packets to the UE 102.5 in a manner that constitutes about 25% of the total air time for the wireless channel for the wireless link 103.2. Moreover, the BSS 104 may communicate with each of the UEs 102.1, 102.2, and 102.3 via each respective wireless link that demands a high traffic load, causing the each of the UEs 102.1, 102.2, 102.3, and 102.4 to divide the airtime equally among one another, with 25% being allocated to each. In other words, each STA (i.e. the UEs 102.1-102.4) will have ~25% of the full throughput (TPT) for that specific connection (depending on BW, MCS etc.).

Thus, when operating in accordance with a conventional implementation, the 4 STAs (i.e. the UEs 102.1-102.4) divide the airtime between one another, resulting in ~25% of the bandwidth for each one. However, applying the process flow 200 as discussed herein, the UE 102.4 may determine that its transmission output power may be decreased to less that 10 dBm EIRP (because its P2P UE 102.5 is in very close range), which removes the ED TL completely. In this way, the UE 102.4 may have full throughout with its P2P client, the UE 102.5, while not causing interference to the other STAs (i.e. the UEs 102.1, 102.2, 102.3). In other words, by reducing the transmission output power to eliminate the ED TH, the UE 102.4 may now upload BE data packets to the UE 102.5 in a manner that constitutes close to 100% of the total air time for the wireless channel for the wireless link 103.2. This in turn also improves the performance of each of the other UEs 102.1, 102.2, 102.3, as each may now be allocated additional bandwidth of ~33% airtime versus ~25%.

Example 3: Different Packet Types

In a third illustrative example, the same configuration is used from Example 1 above with a few differences. In this example, the BSS 104 services one or more of the UEs 102.1, 102.2, 102.3, causing the wireless channel interference level (e.g. measured RF signal energy levels) to be −70 dBm for the wireless channel to be used by the UE 102.4. In this example, the UE 102.4 only communicates with the BSS 106 via the wireless link 103.3. The UE 102.4 and BSS 106 are also assumed to be within a medium range of one another, and the UE 102.4 communicates with the BSS 106 via a 2.4 GHz connection using two different types of data packet transmissions. The first of these includes voice packets transmitted at a low transmission output power, and the other being BE data packets transmitted at a high transmission output power.

Figure 4:
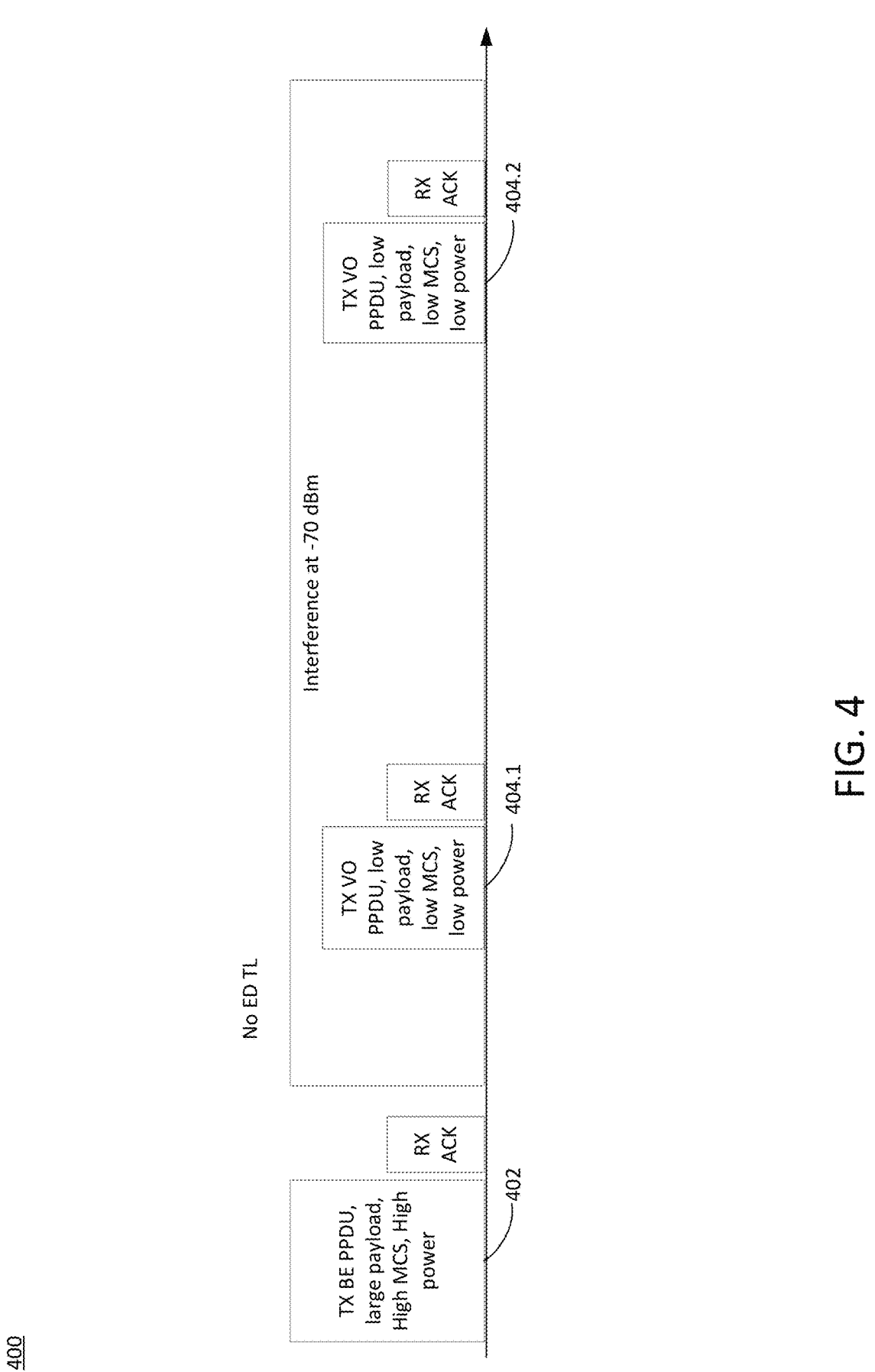
FIG. 4 illustrates an example timing diagram of device communications operating within a wireless network without a defined energy detection (ED) threshold (TL), in accordance with one or more aspects of the present disclosure.

An example of the timing diagram for this illustrative example is shown in further detail with respect to FIG. 4, which illustrates an example timing diagram of device communications operating within a wireless network without a defined ED TL. As shown in FIG. 4, the UE 102.4 transmits the BE PPDU having a large payload, a high MCS, and high transmission output power, as shown by the transmission 402. The UE 102.4 also transmits VO data packets (VO PPDUs) having as low payload, a low MCS, and at a low transmission output power, as shown by the transmissions 404.1, 404.2. The RX ACK transmissions are also shown, indicating ACK reports from the BSS 106.

As shown in FIG. 4, applying the process flow 200 as discussed herein, the aspects enable the UE 102.4 to set a different ED TL for different packet types. In this example, the UE 102.4 has reduced the transmission output power to less than a 10 dBm EIRP and the MCS for voice (latency sensitive) short payload packets. By doing so, the EU 102.4 may completely remove its ED TH. However, for other BE large payload packets (transmission 402), the UE 102.4 may set the transmission output power to a higher setting and maintain an ED TH according to the ED TH formula described above with respect to the ETSI protocol, for instance. Thus, this illustrative example shows that the aspects described herein enable the UE 102.4 to improve the latency of the voice packets while maintaining high PHY rates for large payload aggregations, which are not latency sensitive and have their transmissions deferred until there is no interference in the wireless channel.

Example 4: Dense Wireless Operation

As a fourth illustrative example, reference is now made to FIG. 5, which shows a set of base stations 504.1-504.3 servicing a set of UEs 503.1-503.4 within a wireless networking environment 500, which may include a set of cubicles or working spaces within an office, for instance. The base stations 504 and the UEs 502 may be implemented as similar or identical devices to those described herein with reference to the base station 104 and the UEs 102. In this example, the base stations 504.1-504.3 are implemented as a basic service set (BSS) that service each of the UEs 502.1-502.4 in accordance with one or more Wi-Fi 802.11 Working Group protocols, causing a wireless channel interference level (e.g. measured RF signal energy levels) to be −70 dBm/MHz. Thus, each of the UEs 502.1-502.4 is implemented as a BSS client, and communicates with a respective BSS 504 via the wireless links 503.1-503.4, as shown in FIG. 5.

In this example, each UE 502.1-502.4 may also be configured to wirelessly dock with a respective monitor or display 506.1-506.4 and to communicate with each display 506.1-506.4 via a respective wireless link 505.1-505.4. Thus, in this configuration, each UE 502.1-502.4 is located very close to its respective display 506.1-506.4. Each UE 502.1-502.4 transmits data packets to its respective display 506.1-506.4 via a 2.4 GHz connection, for example. Continuing this example, each wireless link 505.1-505.4 may support data packet transmissions from each UE 502.1-502.4 to a respectively connected display 506.1-506.4 using a low power connection, which may be less than the transmission output power threshold requiring an ED TL, and thus each UE 502.1-502.4 may remove the ED TL requirement. Alternatively, one or more of the UEs 502.1-502.4 may implement a more relaxed (i.e. higher) ED TL to facilitate such data packet transmissions to respective displays 506.1-506.4 due to the interference level caused by the high density of other devices operating in the same environment, thereby enabling other BSS activities at the same time.

Transmission Power and ED TL Adjustment Based Upon Additional Data Packet Types

As discussed above, the aspects described herein with reference to the process flow 200 of FIG. 2 include a transmitting device (e.g. UEs 102.1-102.4) adjusting a transmission parameters on a per data packet basis based upon various transmission parameters, changes in the channel conditions, previously-used transmission parameters, changes in transmission parameters, the success of previous transmissions, etc. Moreover, the aspects described herein include a transmitting device (e.g. UEs 102.1-102.4) adjusting a transmission output power and accompanying ED TL on a per data packet basis based upon the data packet type, which may be related to the communication parameters. For instance, and as noted above, voice or video data packets are more sensitive to latency, while other data packets such as background (BK) and best efforts (BE) data packets may be buffered for a longer time.

In addition to these considerations already noted above, the aspects described in further detail below are directed to a transmitting device (e.g. UEs 102.1-102.4) adjusting the transmission output power and accompanying ED TL (and optionally one or more communication parameters) on a per data packet basis based upon the data packet type, which may include additional types of data packets depending upon a particular receiving device destination and/or transmission type, such as unicast, multicast, and broadcast packets as further discussed below.

Figure 6:
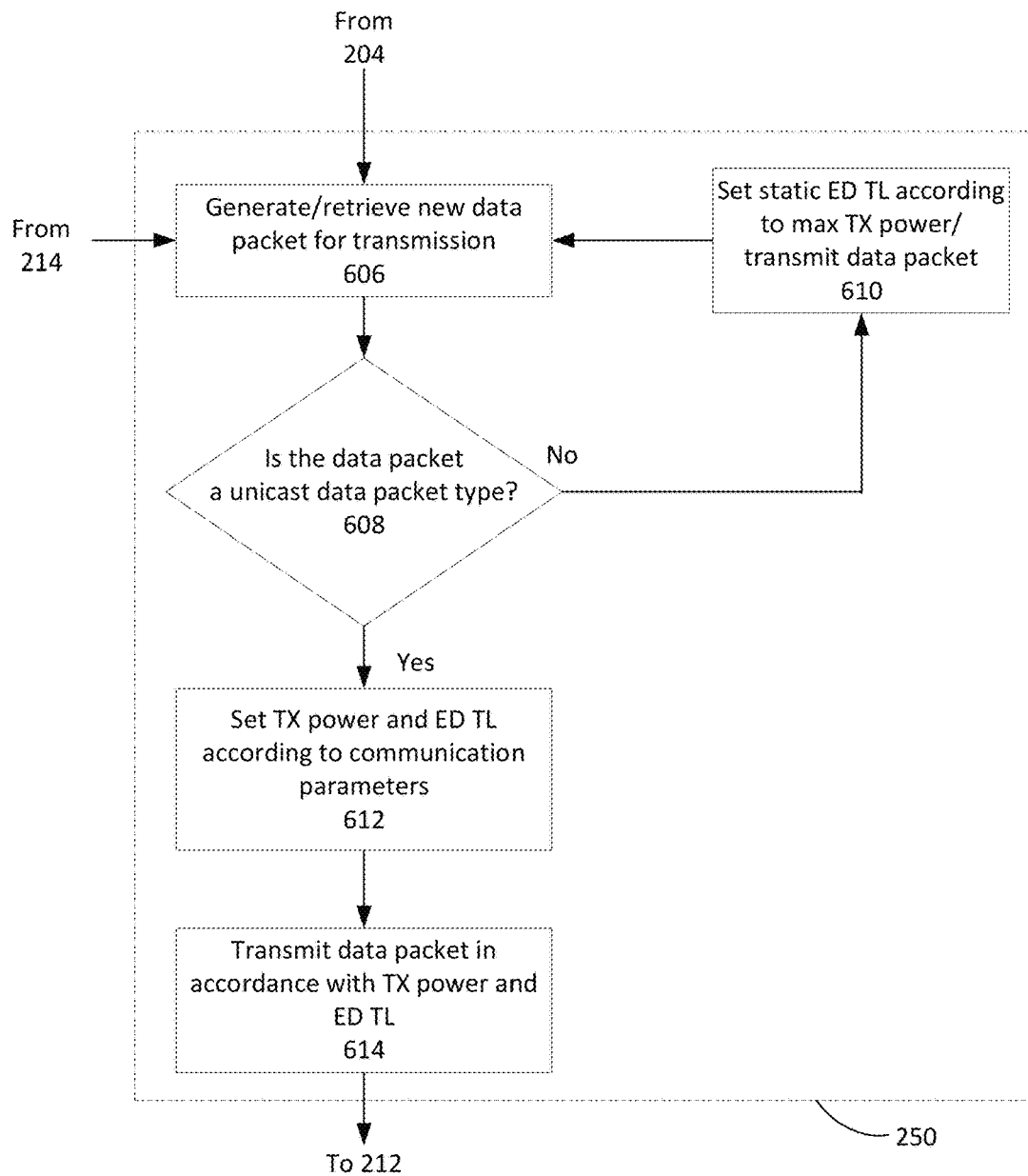
FIG. 6 illustrates an example process flow, in accordance with one or more aspects of the present disclosure.

FIG. 6 illustrates an example of a process flow, in accordance with one or more aspects of the present disclosure. The process flow 600 is an example of overall flow that may be implemented by the base station 104 and/or one or more of the UEs 102, for instance, to facilitate the per data packet ED TL and transmission output power adjustment in accordance with the aspects described herein. The process flow 600 may share part of the same operations with the process flow 200 as shown and described herein with reference to FIG. 2. For example, the process flow 600 may replace the portion 250 of the process flow 200. For example, the process flow 600 may also begin with a determination (block 202) of whether the regulation rules associated with a device (e.g. a UE 102) allow for dynamic ED TL adjustment, and is continue to tune (block 204) the device to a particular channel for data transmission.

The process flow 600 may also include the generation or retrieval (block 606) of a data packet in accordance with a particular communication protocol, as discussed above with respect to process flow 200 (block 206). In an aspect, the generation or retrieval (block 606) of a data packet in accordance with a particular communication protocol flow 606 may be identical to or similar to the same functionality as discussed above with reference to the process flow 200 (block 206). However, the process flow 600 may also include the transmitting device determining (block 608) whether the data packet is a unicast data packet type.

A unicast frame or data packet may include individually addressed packets in which the group bit is set to 0. The destination address of a unicast data packet contains the address of a specific device (e.g. a STA). The destination address of a unicast packet may also be referred to as a directed address, a unicast address, or such a packet may be referred to as being individually addressed.

On the other hand, a multicast frame or data packet may include data packets that contain a group address as a destination address, with the group bit being set to 1. Such data packets may also be known as a group addressed frame. Moreover, a broadcast frame or data packet may include data packets that contain a unique group address that specifies a set of devices (e.g. all STAs within range or within a particular region). Unicast packets are acknowledged on the data link layer, allowing a sending device to know whether a transmission was successful. Aspects include the transmitting device using the group bit data to identify the type of packet as being unicast, multicast, or broadcast. Additionally or alternatively, the transmitting device may exploit knowledge of the recipient (Unicast-single destination or Multicast\Broadcast-multiple\unknown destinations) to make the determination of whether the data packet is a unicast data packet.

Thus, in an aspect the process flow 600 may include the transmitting device determining (block 608) whether the data packet is a unicast data packet type using the destination address of the data packet that is to be transmitted. Using this information, the transmitting device may then identify the data packet as a unicast data packet or a different type of data packet. If the data packet is a unicast data packet, then the process flow 600 may proceed to selectively adjust (block 612) the transmission power and ED TL (again, the transmitting device may, but need not, adjust the transmission power and ED TL, and may adjust other communication parameters as well on a per data packet basis). Otherwise (e.g. if the data packet is a multicast or broadcast data packet type), then the process flow 600 sets (block 610) a static ED TL according to the maximum transmission power and transmits (block 610) the data packet using this maximum transmission output power setting. Thus, a higher transmission output power is desired when the data packet is a multicast or a broadcast data packet such that the transmitted data packet may reach multiple receiving devices (or as many receiving devices as possible within range).

Thus, if it is determined (block 608) that the data packet type is a unicast data packet, the process flow 600 may include the transmitting device setting (block 612) the transmit output power and ED TL accordingly, which may be performed based upon one or more communication parameters associated with the data transmission in addition to the data packet being a unicast data packet, for example. Thus, as discussed above with respect to the process flow 200, this may include the transmitting device (e.g. a UE 102) selectively adjusting (block 612) the transmission output power from an initial or previous (e.g. maximum) transmission output power to an adjusted transmission output power, as well as selectively adjusting the ED TH from an initial or previous ED TH to an adjusted ED TH that reflects the changes in the transmission output power, as the ED TH value is calculated based upon the current transmission output power level, as noted above.

Thus, the process flow 600 may include, in various aspects, the transmitting device setting (block 612) the transmission output power and ED TH in a similar or identical manner as discussed above with respect to the process flow 200 (e.g. block 208), which may include doing so based upon one or more communication parameters or other data packet types (e.g. voice data packets, BK data packets, etc.). However, the process flow 600 differs from the process flow 200 in that the process flow 600 further restricts the adjustment of the transmission output power and ED TH to only unicast data packet types, and does not do so for broadcast or multicast data packet types when applicable for a particular data transmission. Again, and as noted for the process flow 200, although the process flow 600 may include establishing a new or adjusted transmission output power and accompanying ED TH, this need not be the case when it is not warranted to do so based upon RF signal energy measurements in the wireless channel not exceeding the current ED TH or other wireless channel conditions, for instance.

The aspects further include the transmitting device transmitting (block 614) the current data packet via the tuned wireless channel in accordance with either the current or initial transmission output power and accompanying ED TH that was set (block 612), or an adjusted transmission output power and accompanying ED TH that was set (block 612). Again, it is noted that the aspects described herein may set (block 612) the transmission output power and ED TH by removing the ED TH altogether, which may be allowed for transmissions under a threshold transmission output power level.

In an aspect, the process flow 600 may further include the transmitting device performing channel monitoring (block 212) and success ratio monitoring (block 214) as discussed above with respect to the process flow 200, after the transmission (block 614) of the data packet. This process may then be repeated for each newly generated or retrieved data packet, which may include performing the adjustments to the transmission output power, the ED TH, and/or the communication parameters as discussed herein for each unicast data packet, and otherwise using a static transmission output power and ED TL (block 610).

Thus, and as noted for the process flow 200, the process flow 600 may also include the transmitting device adjusting the transmission parameters on a per data packet basis for unicast packets by determining whether an adjustment is needed and, if so, updating the transmitter parameters based upon the channel monitoring and success of prior transmissions as noted above for any suitable number of previous data packet transmissions. In this way, the transmitting device may monitor the channel conditions, previously-used transmission parameters, changes in transmission parameters, the success of previous transmissions, etc. over time and dynamically change the decision to adjust the transmission parameters on a per packet basis.

As an example, a transmitting device may transmit a unicast data packet via a wireless channel, and adjust the transmissions output power and ED TL based upon one or more of the communication parameters as noted above. The transmitting device may then, for a broadcast or multicast data packet transmitted via the wireless channel subsequent to the unicast data packet, further adjust the transmissions output power and ED TL. This may include, for example, adjusting the previous transmission output power and ED TL used for the unicast data packet to a maximum transmission output power and accompanying static ED TL for the subsequently transmitted multicast or broadcast data packet.

ILLUSTRATIVE EXAMPLE

Figure 7:
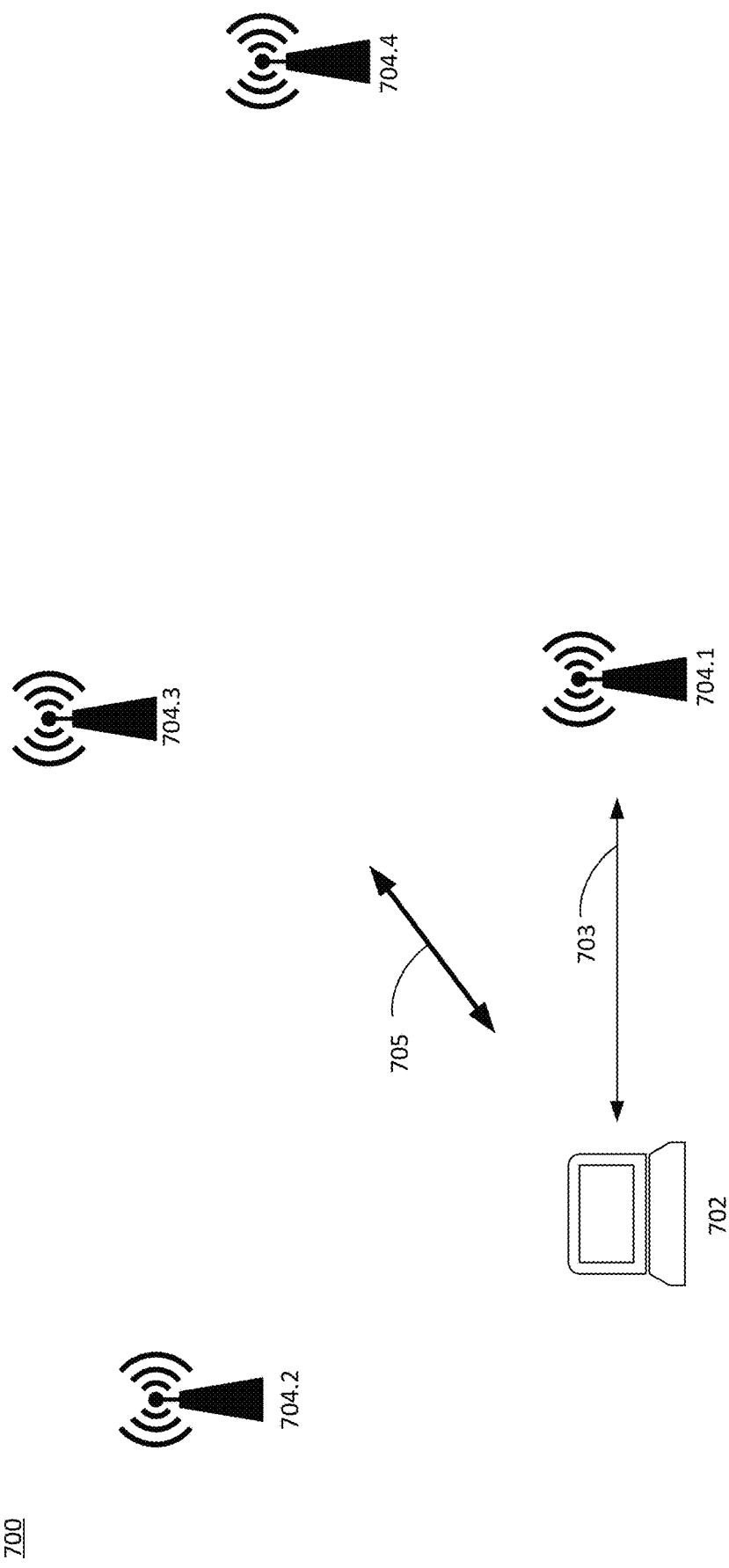
FIG. 7 illustrates an example wireless network, in accordance with one or more aspects of the present disclosure.

FIG. 7 illustrates an example wireless network, in accordance with one or more aspects of the present disclosure. The following illustrative example is provided with respect to the devices as shown in FIG. 7, with reference to the aspects implementing the process flow 600 as shown and described with reference to FIG. 6. This illustrative example is provided for ease of explanation of the aspects described herein, and is by way of example and not limitation.

Figure 8:
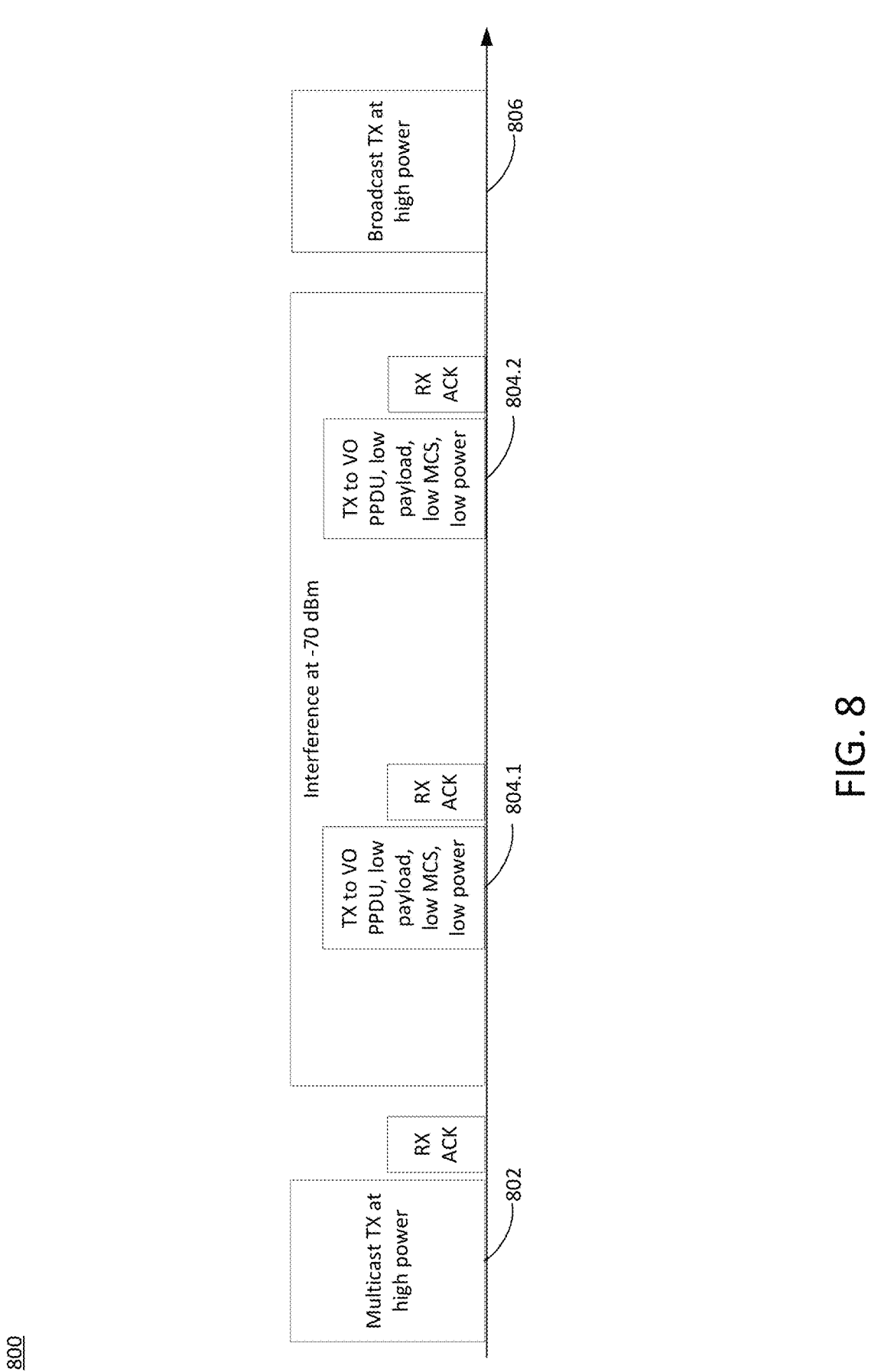
FIG. 8 illustrates another example timing diagram of device communications operating within a wireless network without a defined energy detection ED TL, in accordance with one or more aspects of the present disclosure.

The wireless network 700 as shown in FIG. 7 includes a UE 702 and base stations 704.1-704.4. The base stations 704 and the UE 702 may be implemented as similar or identical devices to those described herein with reference to the base station 104 and the UEs 102. In this example, the base stations 704.1-704.4 are implemented as a basic service set (BSS) in accordance with one or more Wi-Fi 802.11 Working Group protocols. Continuing this example, the UE 702 transmits multicast data packets via the wireless link 705 to each of the BSSs 704.1-704.4. The wireless link 705 may represent a transmission medium associated with multicast and broadcast data transmissions. As shown in the timing diagram in FIG. 8, the UE 702 may transmit the multicast and broadcast data packet transmissions at a high transmission output power (e.g. a maximum allowable transmission output power) with an accompanying ED TL. A multicast data transmission 802 and a broadcast data transmission 806 are each shown in FIG. 8, and cause a wireless channel interference level (e.g. measured RF signal energy levels) to be −70 dBm/MHz in this example.

Furthermore, the UE 702 is connected to and communicates with the BSS 704.1 via the wireless link 703, as shown in FIG. 7. The UE 702 transmits data packets to the BSS 704.1 via a 2.4 GHz wireless connection to perform VOIP calls and file transfers. The UE 702 and the BSS 704.1 may be located in close proximity to one another. In this example, the UE 702 is capable of transmitting voice data packets and BE data packets at a lower transmission power given its close proximity to the BSS 704.1, although conventionally the UE 702 could not transmit in the presence of a −70 dBm/MHz ED TL, as this is based upon the maximum transmission output power of the UE 702.

Thus, in accordance with the aspects described herein with respect to the process flow 600, the UE 702 reduces its transmission output power and adjusts its ED TL to allow transmissions in the presence of the −70 dBm/MHz ED TL for unicast packets. For example, and with reference to FIG. 8, the UE 702 may transmit VO PPDUs having a low payload, a low MCS, and at a low transmission output power as shown by the transmissions 804.1, 804.2. In this example, the UE 702 accomplishes this by reducing the transmission output power to less than 10 dBm EIRP due to the close proximity to the BSS 704.1, allowing the UE 702 to completely remove the ED TL and CCA requirement. However, when the UE 702 transmits multicast or broadcast data packets, the UE 702 may use a maximum transmission output power to discover/reach all the BSSs 704 within range. In this way, the UE 702 is able to transmit unicast packets at a low transmission output power while there is active interference. This leads to a better user experience, decreased latency, decreased jitter, improved spectral reuse, and improved throughput.

Figure 9:
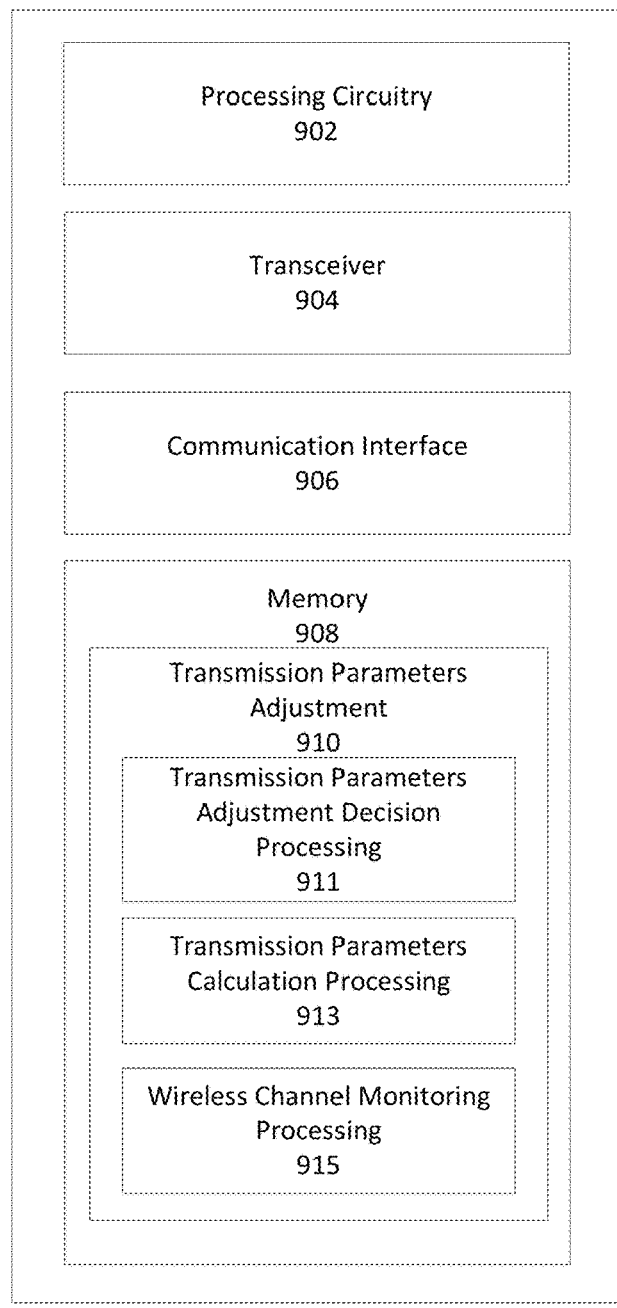
FIG. 9 illustrates an example device, in accordance with one or more aspects of the present disclosure.

FIG. 9 illustrates an example device, in accordance with one or more aspects of the present disclosure. The device 900 may be identified with one or more devices operating with a wireless network in accordance with any suitable number and/or type of communication protocols. For example, the device 900 may be identified with one of the UEs 102 and/or base station 104 as discussed herein with reference to FIG. 1, as an STA within a wireless network, as a BSS within a wireless network, etc. As further discussed below, the device 900 may perform the aspects as discussed herein with respect to, for instance, the process flows 200 and 600 as shown in FIGS. 2 and 6, respectively. Thus, the device 900 may perform the various functionality as described herein with respect to selectively adjusting the transmission output power, the ED TL, and/or communication parameters on a per data packet basis. To do so, the device 900 may include processing circuitry 902, a transceiver 904, a communication interface 906, and a memory 908. The components shown in FIG. 9 are provided for ease of explanation, and aspects include the device 900 implementing additional, less, or alternative components as those shown in FIG. 9.

In various aspects, the processing circuitry 902 may be configured as any suitable number and/or type of computer processors, which may function to control the device 900 and/or other components of the device 900. The processing circuitry 902 may be identified with one or more processors (or suitable portions thereof) implemented by the device 900. For example, the processing circuitry 902 may be identified with one or more processors such as a host processor, a digital signal processor, one or more microprocessors, graphics processors, baseband processors, microcontrollers, an application-specific integrated circuit (ASIC), part (or the entirety of) a field-programmable gate array (FPGA), etc.

In any event, aspects include the processing circuitry 902 being configured to carry out instructions to perform arithmetical, logical, and/or input/output (I/O) operations, and/or to control the operation of one or more components of device 900 to perform various functions associated with the aspects as described herein. For example, the processing circuitry 902 may include one or more microprocessor cores, memory registers, buffers, clocks, etc., and may generate electronic control signals associated with the components of the device 900 to control and/or modify the operation of these components. For example, aspects include the processing circuitry 902 communicating with and/or controlling functions associated with the memory transceiver 904, the communication interface 906, and/or the memory 908.

In an aspect, the transceiver 904 may be implemented as any suitable number and/or type of components configured to transmit and/or receive data packets and/or wireless signals in accordance with any suitable number and/or type of communication protocols. The transceiver 904 may include any suitable type of components to facilitate this functionality, including components associated with known transceiver, transmitter, and/or receiver operation, configurations, and implementations. Although depicted in FIG. 9 as a transceiver, the transceiver 904 may include any suitable number of transmitters, receivers, or combinations of these that may be integrated into a single transceiver or as multiple transceivers or transceiver modules. For example, the transceiver 904 may include components typically identified with an RF front end and include, for example, antennas, ports, power amplifiers (PAs), RF filters, mixers, local oscillators (LOs), low noise amplifiers (LNAs), upconverters, downconverters, channel tuners, etc.

Regardless of the particular implementation, the transceiver 904 may include one or more components configured to listen for and/or measure RF signal energy within one or more wireless channels to determine a current interference level in that wireless channel as discussed herein. Additionally, the transceiver 904 may include one or more components configured to adjust a transmission output power of data packets on a per data packet basis, as discussed herein. This may include, for instance, one or more PAs having an adjustable and/or configurable gain such that the transmission output power (e.g. EIRP) associated with data packet transmissions may be dynamically adjusted.

In an aspect, the communication interface 906 may be configured as any suitable number and/or type of components configured to facilitate the transceiver 904 receiving and/or transmitting data packets and/or signals in accordance with one or more communication protocols, as discussed herein. For example, the communication interface 906 may be implemented as any suitable number and/or type of components that function to interface with the transceiver 904, such as analog-to-digital converters (ADCs), digital to analog converters, intermediate frequency (IF) amplifiers and/or filters, modulators, demodulators, baseband processors, etc. The communication interface 906 may be controlled, for instance, by the processing circuitry 902 to set the specific communication parameters used for a data packet transmission (as well as receiving data packets from other devices) in accordance with the determined communication parameters as discussed above, which may be based upon various conditions, scenarios, or rules to adjust the transmission parameters on a per packet basis.

In an aspect, the memory 908 stores data and/or instructions such that, when the instructions are executed by the processing circuitry 902, cause the device 900 to perform various functions as described herein, such as those described herein with reference to the process flows 200, 600, for example. The memory 908 may be implemented as any well-known volatile and/or non-volatile memory, including, for example, read-only memory (ROM), random access memory (RAM), flash memory, a magnetic storage media, an optical disc, erasable programmable read only memory (EPROM), programmable read only memory (PROM), etc. The memory 908 may be non-removable, removable, or a combination of both. For example, the memory 908 may be implemented as a non-transitory computer readable medium storing one or more executable instructions such as, for example, logic, algorithms, code, etc.

As further discussed below, the instructions, logic, code, etc., stored in the memory 908 are represented by the various modules as shown in FIG. 9, which may enable the aspects disclosed herein to be functionally realized. Alternatively, if the aspects described herein are implemented via hardware, the modules shown in FIG. 9 associated with the memory 908 may include instructions and/or code to facilitate control and/or monitor the operation of such hardware components. In other words, the modules shown in FIG. 9 are provided for ease of explanation regarding the functional association between hardware and software components. Thus, aspects include the processing circuitry 902 executing the instructions stored in these respective modules in conjunction with one or more hardware components to perform the various functions associated with the aspects as further discussed herein.

The transmission parameters adjustment engine 910 may represent the functionality described herein as discussed with reference to the various aspects, such as the process flows 200, 600, for example. This may include, for example, determining when a transmission output power adjustment, ED TL adjustment, and/or communication parameter adjustment may be made, and setting the transmission output power, ED TL, and/or communication parameters on a per-packet basis for data packet transmissions. To do so, aspects include the transmission power adjustment engine 910 comprising a transmission parameters adjustment decision processing module 911, a transmission parameters calculation module 913, and a wireless channel monitoring processing module 915.

In an aspect, the executable instructions stored in the transmission parameters adjustment decision processing module 911 may facilitate, in conjunction with execution via the processing circuitry 902, the device 900 determining whether an adjustment of the transmission parameters may be made, which may include for instance, the transmission output power and accompanying ED TL, as well as one or more communication parameters as discussed herein. This may include, for instance, a determination of whether the regulation rules associated with a current geographic location of the device 900 match those that allow for dynamic transmission output power and ED TL adjustment, as discussed above with respect to FIGS. 2 and 6 (e.g. block 202). This may also include a determination of whether to adjust one or more of the transmission parameters based upon the data packet type (e.g. unicast, multicast, broadcast), as discussed with reference to the process flow 600 in FIG. 6 (block 608), for example. As an additional example, this may include a determination of whether the transmission parameters may be adjusted from one data packet transmission to the next, as discussed herein and further discussed below with reference to the wireless channel monitoring after one or more previous data packet transmissions.

In an aspect, the executable instructions stored in the transmission parameters calculation module 913 may facilitate, in conjunction with execution via the processing circuitry 902, the calculation of specific transmission parameters (e.g. transmission output power, ED TL, and communication parameters) to be calculated for a particular data packet that is to be transmitted. This may include, for example, considering the various scenarios and communication parameters as discussed above, such as those mentioned in each of the illustrative examples. The determination of the specific transmission parameters to implement for a specific data packet transmission may be calculated in any suitable manner as discussed herein, which may include the use of correlated predetermined transmission parameters for specific scenarios and detected wireless channel conditions and/or communication parameters. Again, the calculation of the specific transmission parameters may also be determined based upon subsequent or historical wireless channel monitoring, as discussed herein, using a statistical analysis to machine learning, etc.

In an aspect, the executable instructions stored in the wireless channel monitoring processing module 915 may facilitate, in conjunction with execution via the processing circuitry 902, the calculation of various metrics related to one or more previous data packet transmissions, current wireless channel conditions, a transmission success ratio, etc. This may include, for instance, the device 900 listening and/or performing RF signal energy measurements or other suitable types of wireless channel performance metric calculations during periods of time in which the device 900 is not transmitting or receiving data, or at other suitable times. This may include, for instance, the monitoring as described herein with reference to the process flow 200, 600 (e.g. blocks 212, 214). The device 900 may use the result of these measurements to guide the decision for future data packet transmissions, e.g. whether to adjust the current transmission parameters as noted above.

EXAMPLES

The following examples pertain to further aspects.

Example 1 is a device, comprising: a transmitter configured to transmit data packets to another device via a wireless channel in accordance with a communication protocol that defines an initial energy detection (ED) threshold (TH), the initial ED TH representing a radio frequency (RF) energy interference threshold that is based upon an initial transmission output power, wherein interference is introduced in the wireless channel that meets or exceeds the initial ED TH when the device transmits data packets in accordance with the initial transmission output power, and processing circuitry configured to, on a per-packet basis prior to the transmitter transmitting each data packet from among the data packets via the wireless channel, (i) selectively adjust the output power of the initial transmission output power to an adjusted transmission output power, and (ii) selectively adjust the initial ED TH to an adjusted ED TH that is based upon the adjusted transmission output power, such that the transmitter transmits each data packet from among the data packets via the wireless channel in accordance with either the initial transmission output power or the adjusted transmission output power.

In Example 2, the subject matter of Example 1, wherein the processing circuitry is configured to selectively adjust the initial transmission output power to the adjusted transmission output power that is less than the initial transmission output power, and to selectively adjust the initial ED TH to the adjusted ED TH that is greater than the initial ED TH.

In Example 3, the subject matter of any combination of Examples 1-2, wherein the processing circuitry is configured to determine a geographic location of the device, and to adjust the initial transmission output power to the adjusted transmission output power and to adjust the initial ED TH to the adjusted ED TH only when the geographic location of the device matches a predetermined geographical location.

In Example 4, the subject matter of any combination of Examples 1-3, wherein the processing circuitry is configured to selectively adjust the initial transmission output power to the adjusted transmission output power and to selectively adjust the initial ED TH to the adjusted ED TH based upon communication parameters associated with the transmission of a first data packet from among the data packets to another device via the wireless channel.

In Example 5, the subject matter of any combination of Examples 1-4, wherein the processing circuitry is configured to: for the first data packet transmitted via the wireless channel, adjust the initial transmission output power to the adjusted transmission output power and adjust the initial ED TH to the adjusted ED TH based upon the communication parameters; and for a second data packet from among the data packets transmitted via the wireless channel subsequent to the first data packet, further adjust the adjusted transmission output power and further adjust the adjusted ED TH based upon changes in the communication parameters with respect to when the first data packet was transmitted.

In Example 6, the subject matter of any combination of Examples 1-5, wherein the processing circuitry is configured to selectively adjust the initial transmission output power to the adjusted transmission output power and to selectively adjust the initial ED TH to the adjusted ED TH based upon a data packet type.

In Example 7, the subject matter of any combination of Examples 1-6, wherein the processing circuitry is configured to: for a first data packet of a first data packet type from among the data packets transmitted via the wireless channel, adjust the initial transmission output power to the adjusted transmission output power and adjust the initial ED TH to the adjusted ED TH based upon the first data packet type; and for a second data packet of a second data packet type from among the data packets transmitted via the wireless channel subsequent to the first data packet, further adjust the adjusted transmission output power and further adjust the adjusted ED TH based upon the second data packet type, wherein the first data packet type is different than the second data packet type.

In Example 8, the subject matter of any combination of Examples 1-7, wherein the data packet type includes a unicast data packet, a multicast data packet, or a broadcast packet.

Example 9 is a station (STA), comprising: a memory including computer-readable instructions stored thereon; and one or more processors configured to: cause a transmitter to transmit data packets to another device via a wireless channel in accordance with a communication protocol that defines an initial energy detection (ED) threshold (TH), the initial ED TH representing a radio frequency (RF) energy interference threshold that is based upon an initial transmission output power, wherein interference is introduced in the wireless channel that meets or exceeds the initial ED TH when the device transmits data packets in accordance with the initial transmission output power, and on a per-packet basis prior to the transmitter transmitting each data packet from among the data packets via the wireless channel, (i) selectively adjust the initial transmission output power to an adjusted transmission output power, and (ii) selectively adjust the initial ED TH to an adjusted ED TH, such that the transmitter transmits each data packet from among the data packets via the wireless channel in accordance with either the initial transmission output power or the adjusted transmission output power.

In Example 10, the subject matter of Example 9, wherein the one or more processors are configured to selectively adjust the initial transmission output power to the adjusted transmission output power that is less than the initial transmission output power, and to selectively adjust the initial ED TH to the adjusted ED TH that is greater than the initial ED TH.

In Example 11, the subject matter of any combination of Examples 9-10, wherein the one or more processors are configured to determine a geographic location of the STA, and to adjust the initial transmission output power to the adjusted transmission output power and to adjust the initial ED TH to the adjusted ED TH only when the geographic location of the STA matches a predetermined geographical location.

In Example 12, the subject matter of any combination of Examples 9-11, wherein the one or more processors are configured to selectively adjust the initial transmission output power to the adjusted transmission output power and to selectively adjust the initial ED TH to the adjusted ED TH based upon communication parameters associated with the transmission of a first data packet from among the data packets to another device via the wireless channel.

In Example 13, the subject matter of any combination of Examples 9-12, wherein the one or more processors are configured to: for the first data packet transmitted via the wireless channel, adjust the initial transmission output power to the adjusted transmission output power and adjust the initial ED TH to the adjusted ED TH based upon the communication parameters; and for a second data packet from among the data packets transmitted via the wireless channel subsequent to the first data packet, further adjust the adjusted transmission output power and further adjust the adjusted ED TH based upon changes in the communication parameters with respect to when the first data packet was transmitted.

In Example 14, the subject matter of any combination of Examples 9-13, wherein the processing circuitry is configured to selectively adjust the initial transmission output power to the adjusted transmission output power and to selectively adjust the initial ED TH to the adjusted ED TH based upon a data packet type.

In Example 15, the subject matter of any combination of Examples 9-14, wherein the one or more processors are configured to: for a first data packet of a first data packet type from among the data packets transmitted via the wireless channel, adjust the initial transmission output power to the adjusted transmission output power and adjust the initial ED TH to the adjusted ED TH based upon the first data packet type; and for a second data packet of a second data packet type from among the data packets transmitted via the wireless channel subsequent to the first data packet, further adjust the adjusted transmission output power of the transmitter and further adjust the adjusted ED TH based upon the second data packet type, wherein the first data packet type is different than the second data packet type.

In Example 16, the subject matter of any combination of Examples 9-15, wherein the data packet type includes a unicast data packet, a multicast data packet, or a broadcast packet.

Example 17 is a computer-readable media associated with a wireless device having instructions stored thereon that, when executed by one or more processors, cause the wireless device to: transmit data packets to another device via a wireless channel in accordance with a communication protocol that defines an initial energy detection (ED) threshold (TH), the initial ED TH representing a radio frequency (RF) energy interference threshold that is based upon an initial transmission output power, wherein interference is introduced in the wireless channel that meets or exceeds the initial ED TH when the device transmits data packets in accordance with initial transmission output power, and on a per-packet basis prior to transmitting each data packet from among the data packets via the wireless channel, (i) selectively adjust the initial transmission output power to an adjusted transmission output power, and (ii) selectively adjust the initial ED TH to an adjusted ED TH, such that the transmitter transmits each data packet from among the data packets via the wireless channel in accordance with either the initial transmission output power or the adjusted transmission output power.

In Example 18, the subject matter of Example 17, wherein the computer-readable media further includes instructions that, when executed by one or more processors, cause the wireless device to selectively adjust the initial transmission output power to the adjusted transmission output power that is less than the initial transmission output power, and to selectively adjust the initial ED TH to the adjusted ED TH that is greater than the initial ED TH.

In Example 19, the subject matter of any combination of Examples 17-18, wherein the computer-readable media further includes instructions that, when executed by one or more processors, cause the wireless device to determine a geographic location of the device, and to adjust the initial transmission output power to the adjusted transmission output power and to adjust the initial ED TH to the adjusted ED TH only when the geographic location of the device matches a predetermined geographical location.

In Example 20, the subject matter of any combination of Examples 17-19, wherein the computer-readable media further includes instructions that, when executed by one or more processors, cause the wireless device to selectively adjust the initial transmission output power to the adjusted transmission output power and to selectively adjust the initial ED TH to the adjusted ED TH based upon communication parameters associated with the transmission of a first data packet from among the data packets to another device via the wireless channel.

In Example 21, the subject matter of any combination of Examples 17-20, wherein the computer-readable media further includes instructions that, when executed by one or more processors, cause the wireless device to: for the first data packet transmitted via the wireless channel, adjust the initial transmission output power to the adjusted transmission output power and adjust the initial ED TH to the adjusted ED TH based upon the communication parameters; and for a second data packet from among the data packets transmitted via the wireless channel subsequent to the first data packet, further adjust the adjusted transmission output power and further adjust the adjusted ED TH based upon changes in the communication parameters with respect to when the first data packet was transmitted.

In Example 22, the subject matter of any combination of Examples 17-21, wherein the computer-readable media further includes instructions that, when executed by one or more processors, cause the wireless device to: selectively adjust the initial transmission output power to the adjusted transmission output power and to selectively adjust the initial ED TH to the adjusted ED TH based upon a data packet type.

In Example 23, the subject matter of any combination of Examples 17-22, wherein the computer-readable media further includes instructions that, when executed by one or more processors, cause the wireless device to: for a first data packet of a first data packet type from among the data packets transmitted via the wireless channel, adjust the initial transmission output power to the adjusted transmission output power and adjust the initial ED TH to the adjusted ED TH based upon the first data packet type; and for a second data packet of a second data packet type from among the data packets transmitted via the wireless channel subsequent to the first data packet, further adjust the adjusted transmission output power and further adjust the adjusted ED TH based upon the second data packet type, wherein the first data packet type is different than the second data packet type.

In Example 24, the subject matter of any combination of Examples 17-23, wherein the data packet type includes a unicast data packet, a multicast data packet, or a broadcast packet.

Example 25 is a device, comprising: a transmitter means for transmitting data packets to another device via a wireless channel in accordance with a communication protocol that defines an initial energy detection (ED) threshold (TH), the initial ED TH representing a radio frequency (RF) energy interference threshold that is based upon an initial transmission output power, wherein interference is introduced in the wireless channel that meets or exceeds the initial ED TH when the device transmits data packets in accordance with the initial transmission output power, and processing means for, on a per-packet basis prior to the transmitter means transmitting each data packet from among the data packets via the wireless channel, (i) selectively adjust the output power of the initial transmission output power to an adjusted transmission output power, and (ii) selectively adjust the initial ED TH to an adjusted ED TH that is based upon the adjusted transmission output power, such that the transmitter means transmits each data packet from among the data packets via the wireless channel in accordance with either the initial transmission output power or the adjusted transmission output power.

In Example 26, the subject matter of Example 25, wherein the processing means selectively adjusts the initial transmission output power to the adjusted transmission output power that is less than the initial transmission output power, and selectively adjusts the initial ED TH to the adjusted ED TH that is greater than the initial ED TH.

In Example 27, the subject matter of any combination of Examples 25-26, wherein the processing means determines a geographic location of the device, and adjusts the initial transmission output power to the adjusted transmission output power and adjusts the initial ED TH to the adjusted ED TH only when the geographic location of the device matches a predetermined geographical location.

In Example 28, the subject matter of any combination of Examples 25-27, wherein the processing means selectively adjusts the initial transmission output power to the adjusted transmission output power and selectively adjusts the initial ED TH to the adjusted ED TH based upon communication parameters associated with the transmission of a first data packet from among the data packets to another device via the wireless channel.

In Example 29, the subject matter of any combination of Examples 25-28, wherein the processing circuitry means: for the first data packet transmitted via the wireless channel, adjusts the initial transmission output power to the adjusted transmission output power and adjusts the initial ED TH to the adjusted ED TH based upon the communication parameters; and for a second data packet from among the data packets transmitted via the wireless channel subsequent to the first data packet, further adjusts the adjusted transmission output power and further adjusts the adjusted ED TH based upon changes in the communication parameters with respect to when the first data packet was transmitted.

In Example 30, the subject matter of any combination of Examples 25-29, wherein the processing means selectively adjusts the initial transmission output power to the adjusted transmission output power and selectively adjusts the initial ED TH to the adjusted ED TH based upon a data packet type.

In Example 31, the subject matter of any combination of Examples 25-30, wherein the processing means: for a first data packet of a first data packet type from among the data packets transmitted via the wireless channel, adjusts the initial transmission output power to the adjusted transmission output power and adjusts the initial ED TH to the adjusted ED TH based upon the first data packet type; and for a second data packet of a second data packet type from among the data packets transmitted via the wireless channel subsequent to the first data packet, further adjusts the adjusted transmission output power and further adjusts the adjusted ED TH based upon the second data packet type, wherein the first data packet type is different than the second data packet type.

In Example 32, the subject matter of any combination of Examples 25-31, wherein the data packet type includes a unicast data packet, a multicast data packet, or a broadcast packet.

Example 33 is a station (STA), comprising: a memory including computer-readable instructions stored thereon; and one or more processor means for causing a transmitter means to transmit data packets to another device via a wireless channel in accordance with a communication protocol that defines an initial energy detection (ED) threshold (TH), the initial ED TH representing a radio frequency (RF) energy interference threshold that is based upon an initial transmission output power, wherein interference is introduced in the wireless channel that meets or exceeds the initial ED TH when the device transmits data packets in accordance with the initial transmission output power, and on a per-packet basis prior to the transmitter means transmitting each data packet from among the data packets via the wireless channel, (i) selectively adjusts the initial transmission output power to an adjusted transmission output power, and (ii) selectively adjusts the initial ED TH to an adjusted ED TH, such that the transmitter means transmits each data packet from among the data packets via the wireless channel in accordance with either the initial transmission output power or the adjusted transmission output power.

In Example 34, the subject matter of Example 33, wherein the one or more processor means selectively adjust the initial transmission output power to the adjusted transmission output power that is less than the initial transmission output power, and selectively adjust the initial ED TH to the adjusted ED TH that is greater than the initial ED TH.

In Example 35, the subject matter of any combination of Examples 33-34, wherein the one or more processors means determine a geographic location of the STA, adjust the initial transmission output power to the adjusted transmission output power, and adjust the initial ED TH to the adjusted ED TH only when the geographic location of the STA matches a predetermined geographical location.

In Example 36, the subject matter of any combination of Examples 33-35, wherein the one or more processors means selectively adjust the initial transmission output power to the adjusted transmission output power and selectively adjust the initial ED TH to the adjusted ED TH based upon communication parameters associated with the transmission of a first data packet from among the data packets to another device via the wireless channel.

In Example 37, the subject matter of any combination of Examples 33-36, wherein the one or more processors means: for the first data packet transmitted via the wireless channel, adjust the initial transmission output power to the adjusted transmission output power and adjust the initial ED TH to the adjusted ED TH based upon the communication parameters; and for a second data packet from among the data packets transmitted via the wireless channel subsequent to the first data packet, further adjust the adjusted transmission output power and further adjust the adjusted ED TH based upon changes in the communication parameters with respect to when the first data packet was transmitted.

In Example 38, the subject matter of any combination of Examples 33-37, wherein the processing means selectively adjust the initial transmission output power to the adjusted transmission output power and selectively adjust the initial ED TH to the adjusted ED TH based upon a data packet type.

In Example 39, the subject matter of any combination of Examples 33-38, wherein the one or more processors means: for a first data packet of a first data packet type from among the data packets transmitted via the wireless channel, adjust the initial transmission output power to the adjusted transmission output power and adjust the initial ED TH to the adjusted ED TH based upon the first data packet type; and for a second data packet of a second data packet type from among the data packets transmitted via the wireless channel subsequent to the first data packet, further adjust the adjusted transmission output power of the transmitter means and further adjust the adjusted ED TH based upon the second data packet type, wherein the first data packet type is different than the second data packet type.

In Example 40, the subject matter of any combination of Examples 33-39, wherein the data packet type includes a unicast data packet, a multicast data packet, or a broadcast packet.

Example 41 is a computer-readable media associated with a wireless device having instructions stored thereon that, when executed by one or more processor means, cause the wireless device to: transmit, via a transmitter means, data packets to another device via a wireless channel in accordance with a communication protocol that defines an initial energy detection (ED) threshold (TH), the initial ED TH representing a radio frequency (RF) energy interference threshold that is based upon an initial transmission output power, wherein interference is introduced in the wireless channel that meets or exceeds the initial ED TH when the device transmits data packets in accordance with initial transmission output power, and on a per-packet basis prior to transmitting each data packet from among the data packets via the wireless channel, (i) selectively adjust the initial transmission output power to an adjusted transmission output power, and (ii) selectively adjust the initial ED TH to an adjusted ED TH, such that the transmitter means transmits each data packet from among the data packets via the wireless channel in accordance with either the initial transmission output power or the adjusted transmission output power.

In Example 42, the subject matter of Example 41, wherein the computer-readable media further includes instructions that, when executed by one or more processor means, cause the wireless device to selectively adjust the initial transmission output power to the adjusted transmission output power that is less than the initial transmission output power, and to selectively adjust the initial ED TH to the adjusted ED TH that is greater than the initial ED TH.

In Example 43, the subject matter of any combination of Examples 41-42, wherein the computer-readable media further includes instructions that, when executed by one or more processor means, cause the wireless device to determine a geographic location of the device, to adjust the initial transmission output power to the adjusted transmission output power, and to adjust the initial ED TH to the adjusted ED TH only when the geographic location of the device matches a predetermined geographical location.

In Example 44, the subject matter of any combination of Examples 41-43, wherein the computer-readable media further includes instructions that, when executed by one or more processor means, cause the wireless device to selectively adjust the initial transmission output power to the adjusted transmission output power and to selectively adjust the initial ED TH to the adjusted ED TH based upon communication parameters associated with the transmission of a first data packet from among the data packets to another device via the wireless channel.

In Example 45, the subject matter of any combination of Examples 41-44, wherein the computer-readable media further includes instructions that, when executed by one or more processor means, cause the wireless device to: for the first data packet transmitted via the wireless channel, adjust the initial transmission output power to the adjusted transmission output power and adjust the initial ED TH to the adjusted ED TH based upon the communication parameters; and for a second data packet from among the data packets transmitted via the wireless channel subsequent to the first data packet, further adjust the adjusted transmission output power and further adjust the adjusted ED TH based upon changes in the communication parameters with respect to when the first data packet was transmitted.

In Example 46, the subject matter of any combination of Examples 41-45, wherein the computer-readable media further includes instructions that, when executed by one or more processor means, cause the wireless device to: selectively adjust the initial transmission output power to the adjusted transmission output power and to selectively adjust the initial ED TH to the adjusted ED TH based upon a data packet type.

In Example 47, the subject matter of any combination of Examples 41-46, wherein the computer-readable media further includes instructions that, when executed by one or more processor means, cause the wireless device to: for a first data packet of a first data packet type from among the data packets transmitted via the wireless channel, adjust the initial transmission output power to the adjusted transmission output power and adjust the initial ED TH to the adjusted ED TH based upon the first data packet type; and for a second data packet of a second data packet type from among the data packets transmitted via the wireless channel subsequent to the first data packet, further adjust the adjusted transmission output power and further adjust the adjusted ED TH based upon the second data packet type, wherein the first data packet type is different than the second data packet type.

In Example 48, the subject matter of any combination of Examples 41-47, wherein the data packet type includes a unicast data packet, a multicast data packet, or a broadcast packet.

An apparatus as shown and described.

A method as shown and described.

CONCLUSION

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processing circuitry" or "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to aspects described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary aspects described herein, processing circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

What is claimed is:

1. A device, comprising:
   a transmitter configured to transmit data packets to another device via a wireless channel in accordance with a communication protocol that defines an initial energy detection threshold, the initial energy detection threshold representing a radio frequency (RF) energy interference threshold with respect to an interference level in the wireless channel based on a listening operation that is a part of a clear channel assessment (CCA) that identifies transmissions of other transmitters,
   wherein the initial energy detection threshold is based upon an initial transmission output power,
   wherein interference is introduced in the wireless channel that meets or exceeds the initial energy detection threshold when the device transmits data packets in accordance with the initial transmission output power, which results in an interfering collision with concurrent transmissions from other transmitters; and
   processing circuitry configured to, on a per-packet basis prior to the transmitter transmitting each data packet from among the data packets via the wireless channel, (i) selectively adjust the initial transmission output power to an adjusted transmission output power, and (ii) selectively adjust the initial energy detection threshold to an adjusted energy detection threshold that is based upon the adjusted transmission output power, such that the transmitter transmits each data packet from among the data packets via the wireless channel in accordance with either the initial transmission output power or the adjusted transmission output power,
   wherein, for a first data packet transmitted via the wireless channel, the initial transmission output power is adjusted to the adjusted transmission output power and the initial energy detection threshold is adjusted to the adjusted energy detection threshold based upon communication parameters associated with the transmission of the first data packet, and
   wherein, for a second data packet transmitted via the wireless channel subsequent to the first data packet, the adjusted transmission output power is further adjusted and the adjusted energy detection threshold is further adjusted based upon changes in the communication parameters with respect to when the first data packet was transmitted.

2. The device of claim 1, wherein the processing circuitry is configured to selectively adjust the initial transmission output power to the adjusted transmission output power that is less than the initial transmission output power, and to selectively adjust the initial energy detection threshold to the adjusted energy detection threshold that is greater than the initial energy detection threshold.

3. The device of claim 1, wherein the processing circuitry is configured to determine a geographic location of the device, and to adjust the initial transmission output power to the adjusted transmission output power and to adjust the initial energy detection threshold to the adjusted energy detection threshold only when the geographic location of the device matches a predetermined geographic location.

4. The device of claim 1, wherein the processing circuitry is configured to selectively adjust the initial transmission output power to the adjusted transmission output power and to selectively adjust the initial energy detection threshold to the adjusted energy detection threshold based upon a data packet type.

5. The device of claim 4, wherein the processing circuitry is configured to:
   for the first data packet of a first data packet type transmitted via the wireless channel, adjust the initial transmission output power to the adjusted transmission output power and adjust the initial energy detection threshold to the adjusted energy detection threshold based upon the first data packet type; and for the second data packet of a second data packet type transmitted via the wireless channel subsequent to the first data packet, further adjust the adjusted transmission output power and further adjust the adjusted energy detection threshold based upon the second data packet type, wherein the first data packet type is different than the second data packet type.

6. The device of claim 4, wherein the data packet type includes a unicast data packet, a multicast data packet, or a broadcast packet.

7. The device of claim 1, wherein the initial energy detection threshold is defined in accordance with a combination of a frequency band used for transmission over the wireless channel and the initial transmission output power.

8. The device of claim 1, wherein the processing circuitry is configured to selectively adjust the initial transmission output power and to selectively adjust the initial energy detection threshold in response to monitored conditions of the wireless channel that are measured in accordance with the transmission parameters used to transmit a previous data packet.

9. The device of claim 1, wherein the processing circuitry is configured to selectively adjust the initial transmission output power and to selectively adjust the initial energy detection threshold based upon a success ratio associated with one or more previous data packet transmissions.

10. A station (STA), comprising:
a memory including computer-readable instructions stored thereon; and
one or more processors configured to:
cause a transmitter to transmit data packets to another device via a wireless channel in accordance with a communication protocol that defines an initial energy detection threshold, the initial energy detection threshold representing a radio frequency (RF) energy interference threshold with respect to a measured interference level in the wireless channel based on a listening operation that is a part of a clear channel assessment (CCA) that identifies transmissions of other transmitters,
wherein the initial energy detection threshold is based upon an initial transmission output power,
wherein interference is introduced in the wireless channel that meets or exceeds the initial energy detection threshold when the device transmits data packets in accordance with the initial transmission output power, which results in an interfering collision with concurrent transmissions from other transmitters, and
on a per-packet basis prior to the transmitter transmitting each data packet from among the data packets via the wireless channel, (i) selectively adjust the initial transmission output power to an adjusted transmission output power, and (ii) selectively adjust the initial energy detection threshold to an adjusted energy detection threshold, such that the transmitter transmits each data packet from among the data packets via the wireless channel in accordance with either the initial transmission output power or the adjusted transmission output power,
wherein, for a first data packet transmitted via the wireless channel, the initial transmission output power is adjusted to the adjusted transmission output power and the initial energy detection threshold is adjusted to the adjusted energy detection threshold based upon communication parameters associated with the transmission of the first data packet, and wherein, for a second data packet transmitted via the wireless channel subsequent to the first data packet, the adjusted transmission output power is further adjusted and the adjusted energy detection threshold is further adjusted based upon changes in the communication parameters with respect to when the first data packet was transmitted.

11. The STA of claim 10, wherein the one or more processors are configured to selectively adjust the initial transmission output power to the adjusted transmission output power that is less than the initial transmission output power, and to selectively adjust the initial energy detection threshold to the adjusted energy detection threshold that is greater than the initial energy detection threshold.

12. The STA of claim 10, wherein the one or more processors are configured to determine a geographic location of the STA, and to adjust the initial transmission output power to the adjusted transmission output power and to adjust the initial energy detection threshold to the adjusted energy detection threshold only when the geographic location of the STA matches a predetermined geographic location.

13. The STA of claim 10, wherein the one or more processors are configured to selectively adjust the initial transmission output power to the adjusted transmission output power and to selectively adjust the initial energy detection threshold to the adjusted energy detection threshold based upon a data packet type.

14. The STA of claim 13, wherein the one or more processors are configured to:
for the first data packet of a first data packet type transmitted via the wireless channel, adjust the initial transmission output power to the adjusted transmission output power and adjust the initial energy detection threshold to the adjusted energy detection threshold based upon the first data packet type; and
for the second data packet of a second data packet type s transmitted via the wireless channel subsequent to the first data packet, further adjust the adjusted transmission output power of the transmitter and further adjust the adjusted energy detection threshold based upon the second data packet type,
wherein the first data packet type is different than the second data packet type.

15. The STA of claim 13, wherein the data packet type includes a unicast data packet, a multicast data packet, or a broadcast packet.

16. A non-transitory computer-readable medium associated with a wireless device having instructions stored thereon that, when executed by one or more processors, cause the wireless device to:
transmit, via a transmitter, data packets to another device via a wireless channel in accordance with a communication protocol that defines an initial energy detection threshold, the initial energy detection threshold representing a radio frequency (RF) energy interference threshold with respect to a measured interference level in the wireless channel based on a listening operation that is a part of a clear channel assessment (CCA) that identifies transmissions of other transmitters,
wherein the initial energy detection threshold is based upon an initial transmission output power,
wherein interference is introduced in the wireless channel that meets or exceeds the initial energy detection threshold when the device transmits data packets in accordance with initial transmission output power, which results in an interfering collision with concurrent transmissions from other transmitters; and on a per-packet basis prior to transmitting each data packet from among the data packets via the wireless channel, (i) selectively adjust the initial transmission output power to an adjusted transmission output power, and (ii) selectively adjust the initial energy detection threshold to an adjusted energy detection threshold, such that the transmitter transmits each data packet from among the data packets via the wireless channel in accordance with either the initial transmission output power or the adjusted transmission output power, wherein, for a first data packet transmitted via the wireless channel, the initial transmission output power is adjusted to the adjusted transmission output power and the initial energy detection threshold is adjusted to the adjusted energy detection threshold based upon communication parameters associated with the transmission of the first data packet, and wherein, for a second data packet transmitted via the wireless channel subsequent to the first data packet, the adjusted transmission output power is further adjusted and the adjusted energy detection threshold is further adjusted based upon changes in the communication parameters with respect to when the first data packet was transmitted.

17. The non-transitory computer-readable medium of claim 16, wherein the non-transitory computer-readable medium further includes instructions that, when executed by the one or more processors, cause the wireless device to selectively adjust the initial transmission output power to the adjusted transmission output power that is less than the initial transmission output power, and to selectively adjust the initial energy detection threshold to the adjusted energy detection threshold that is greater than the initial energy detection threshold.

18. The non-transitory computer-readable medium of claim 16, wherein the non-transitory computer-readable medium further includes instructions that, when executed by the one or more processors, cause the wireless device to determine a geographic location of the wireless device, and to adjust the initial transmission output power to the adjusted transmission output power and to adjust the initial energy detection threshold to the adjusted energy detection threshold only when the geographic location of the wireless device matches a predetermined geographic location.

19. The non-transitory computer-readable medium of claim 16, wherein the non-transitory computer-readable medium further includes instructions that, when executed by the one or more processors, cause the wireless device to:
selectively adjust the initial transmission output power to the adjusted transmission output power and to selectively adjust the initial energy detection threshold to the adjusted energy detection threshold based upon a data packet type.

20. The non-transitory computer-readable medium of claim 19, wherein the non-transitory computer-readable medium further includes instructions that, when executed by the one or more processors, cause the wireless device to:
for the first data packet of a first data packet type from among the data packets transmitted via the wireless channel, adjust the initial transmission output power to the adjusted transmission output power and adjust the initial energy detection threshold to the adjusted energy detection threshold based upon the first data packet type; and
for the second data packet of a second data packet type from among the data packets transmitted via the wireless channel subsequent to the first data packet, further adjust the adjusted transmission output power and further adjust the adjusted energy detection threshold based upon the second data packet type,
wherein the first data packet type is different than the second data packet type.

21. The non-transitory computer-readable medium of claim 19, wherein the data packet type includes a unicast data packet, a multicast data packet, or a broadcast packet.

* * * * *